United States Patent
Yang et al.

(10) Patent No.: US 11,671,864 B2
(45) Date of Patent: Jun. 6, 2023

(54) JOINT TRANSMISSION METHOD AND COMMUNICATIONS APPARATUS

(71) Applicant: Huawei Technologies Co., Ltd., Shenzhen (CN)

(72) Inventors: Mao Yang, Xi'an (CN); Bo Li, Xi'an (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 17/142,764

(22) Filed: Jan. 6, 2021

(65) Prior Publication Data

US 2021/0127290 A1 Apr. 29, 2021

Related U.S. Application Data

(63) Continuation of application No. PCT/CN2019/087084, filed on May 15, 2019.

(30) Foreign Application Priority Data

Jul. 6, 2018 (CN) .......................... 201810737325.6

(51) Int. Cl.
*H04W 28/02* (2009.01)
*H04W 88/08* (2009.01)
*H04W 88/12* (2009.01)

(52) U.S. Cl.
CPC ........ *H04W 28/0205* (2013.01); *H04W 88/08* (2013.01); *H04W 88/12* (2013.01)

(58) Field of Classification Search
None
See application file for complete search history.

(56) References Cited

U.S. PATENT DOCUMENTS 8,948,074 B2 2/2015 Ni et al.
9,179,444 B2 11/2015 Van Phan et al.
(Continued)

FOREIGN PATENT DOCUMENTS

CN 102025403 A 4/2011
CN 104144475 A 11/2014
(Continued)

OTHER PUBLICATIONS

Weifeng Su et al., Cooperative Communication Protocols in Wireless Networks: Performance Analysis and Optimum Power Allocation. Wireless Personal Communications vol. 44, 2008, pp. 181-217, 37 pages.

(Continued)

*Primary Examiner* — Nicholas Sloms
(74) *Attorney, Agent, or Firm* — Conley Rose, P.C.

(57) ABSTRACT

A joint transmission method includes sending, using a first access point (AP), a buffer indication to a second AP instructing the second AP to buffer first data, sending the first data to a station (STA), receiving a response frame from the STA, determining, based on the response frame, whether a joint transmission procedure needs to be initiated, sending a joint transmission indication to a third AP in response to determining to initiate the joint transmission procedure, where the joint transmission indication instructs the third AP to send second data to the STA, where the second data comprises all or a part of the first data, and where the third AP is the second AP, and sending the second data.

20 Claims, 12 Drawing Sheets

(56) References Cited

U.S. PATENT DOCUMENTS

| | | |
|---|---|---|
| 9,184,871 B2 | 11/2015 | Kim et al. |
| 9,560,694 B2 | 1/2017 | Lau |
| 9,699,740 B2 | 7/2017 | Bontu et al. |
| 2014/0201311 A1* | 7/2014 | Lau ................ H04W 88/08 709/213 |
| 2015/0003330 A1* | 1/2015 | Morita ............. H04L 5/0035 370/328 |
| 2015/0009966 A1* | 1/2015 | Lee ................ H04B 7/0617 370/336 |
| 2015/0288427 A1 | 10/2015 | Wang et al. |
| 2015/0327236 A1* | 11/2015 | Lin ................ H04W 72/0406 370/329 |
| 2016/0028448 A1* | 1/2016 | Park ................ H04B 7/26 375/267 |
| 2016/0094285 A1 | 3/2016 | Ayoughi et al. |
| 2016/0234802 A1 | 8/2016 | Yang et al. |
| 2016/0381665 A1* | 12/2016 | Callard ............ H04B 7/022 370/329 |
| 2017/0237535 A1* | 8/2017 | Park ................ H04B 7/0478 370/329 |
| 2017/0311310 A1 | 10/2017 | Ryu et al. |
| 2018/0049236 A1* | 2/2018 | Sun ................. H04L 5/0048 |
| 2019/0132762 A1* | 5/2019 | Zhu ................. H04B 7/024 |
| 2019/0297555 A1* | 9/2019 | Hampel ............ H04W 40/28 |
| 2020/0178043 A1* | 6/2020 | Cavalcanti ........ H04W 4/08 |
| 2021/0250981 A1* | 8/2021 | Takeda ............ H04W 72/1257 |

FOREIGN PATENT DOCUMENTS

| | | |
|---|---|---|
| CN | 107040356 A | 8/2017 |
| CN | 107302774 A | 10/2017 |
| CN | 107534999 A | 1/2018 |
| WO | 2017012125 A1 | 1/2017 |
| WO | 2017133416 A1 | 8/2017 |

OTHER PUBLICATIONS

Ahmed S. Ibrahim et al., Cooperative Communications with Relay-Selection: When to Cooperate and Whom to Cooperate With? IEEE Transactions on Wireless Communications, vol. 7, No. 7, Jul. 2008, 14 pages.

J. Nicholas Laneman et al., Distributed Space Time-Coded Protocols for Exploiting Cooperative Diversity in Wireless Networks. IEEE Transactions on Information Theory, vol. 49, No. 10, Oct. 2003, 11 pages.

* cited by examiner

| Identification information of at least one second AP | Identification information of at least one STA | TID | Starting sequence number | Quantity of MSDUs |

| Coordination ID | Quantity of STAs | STA 1 | ... | STA n |

| Coordination ID | Quantity of coordinated APs | Coordinated AP 1 | ... | Coordinated AP n | Quantity of STAs | STA 1 | ... | STA n |

FIG. 13

JOINT TRANSMISSION METHOD AND COMMUNICATIONS APPARATUS

CROSS-REFERENCE TO RELATED APPLICATIONS

This application is a continuation of International Patent Application No. PCT/CN2019/087084 filed on May 15, 2019, which claims priority to Chinese Patent Application No. 201810737325.6 filed on Jul. 6, 2018. The disclosures of the aforementioned applications are hereby incorporated by reference in their entireties.

TECHNICAL FIELD

Embodiments of this application relate to the communications field, and in particular, to a joint transmission method and a communications apparatus.

BACKGROUND

An access point (AP) is an access point used in a wireless network, and a wireless AP is an access point for enabling a wireless terminal device to access a wired network. A plurality of APs can jointly send data to a station (STA) in a coordination manner.

The coordination manner is mainly as follows. Before sending data to a STA, a master AP sends the data to coordinated APs, then, when joint transmission is needed, the master AP instructs the coordinated APs to perform joint transmission, that is, the master AP instructs the coordinated APs to send buffered data to the STA together with the master AP.

However, in other approaches coordination manner, when the master AP sends data to the coordinated APs, if wireless sharing is used, a large quantity of air interface resources are occupied due to a large amount of transmitted data. If wired sharing is used, a delay is high, which affects transmission quality and increases network load.

SUMMARY

This application provides a joint transmission method and a communications apparatus such that a problem that a large quantity of air interface resources are occupied or a delay on an air interface is high when a first AP shares first data with a second AP can be avoided to some extent.

To achieve the foregoing objective, this application uses the following technical solutions.

According to a first aspect, a communications apparatus applied to a first AP is provided, where the communications apparatus may further include a sending module and a processing module. The sending module is configured to send a buffer indication to at least one second AP, where the buffer indication is used to instruct the at least one second AP to buffer first data sent by the first AP, the sending module may be further configured to send the first data to at least one station STA, where the first data includes data of the at least one STA, and the processing module in the communications apparatus is configured to determine, based on a response frame returned by the at least one STA, whether a joint transmission procedure needs to be initiated. The sending module may be further configured to send a joint transmission indication to at least one third AP when the processing module determines to initiate the joint transmission procedure, where the joint transmission indication is used to instruct the at least one third AP to send second data to the at least one STA, the second data is all or a part of the first data, and the at least one third AP is one or more of the at least one second AP, and the sending module may be further configured to send the second data, where a sending time at which the sending module sends the second data is the same as a sending time at which the at least one third AP sends the second data.

In this application, the first AP sends the buffer indication to the second AP such that the second AP buffers data in the process in which the first AP sends the data to the at least one STA. Therefore, the delay can be reduced while the air interface resources occupied are reduced, and user experience is effectively improved.

In a possible implementation, the buffer indication may include first identification information indicative of the at least one second AP buffering the first data.

Based on the first identification information, the first AP can flexibly specify a second AP that needs to buffer the first data.

In a possible implementation, the buffer indication may include second identification information indicative of the at least one STA corresponding to the first data to be buffered by the at least one second AP.

In the foregoing manner, the second AP buffers the data of a specified STA, and does not need to buffer the data sent by the first AP to all STAs, thereby reducing memory overheads.

In a possible implementation, the first data sent by the first AP includes at least one media access control (MAC) service data unit (MSDU), and the buffer indication may further include a first data unit identifier, which is indicative of the at least one MSDU in the first data to be buffered by the at least one second AP.

In the foregoing manner, the second AP buffers a specified MSDU, thereby reducing memory overheads.

In a possible implementation, the first data unit identifier may include a traffic identifier of the at least one MSDU, a starting sequence number of the at least one MSDU, and a quantity of consecutive buffered MSDUs starting from an MSDU indicated by the starting sequence number.

In the foregoing manner, the second AP may buffer a plurality of consecutive MSDUs starting from the MSDU indicated by the starting sequence number, and does not need to buffer all the MSDUs such that the memory overheads are reduced. In addition, the first AP does not need to add sequence numbers of all the MSDUs that need to be buffered to the buffer indication such that signaling overheads are reduced.

In a possible implementation, the first AP and the at least one second AP belong to a same coordination set, and in this implementation, the first identification information is an identifier (ID) of the coordination set.

In the foregoing manner, the first AP instructs, based on the coordination set, the second AP in the coordination set to buffer the first data such that the first AP can flexibly specify the second AP that needs to buffer the first data.

In a possible implementation, the buffer indication is included in a physical layer preamble of the first data, or the buffer indication is included in an A-Control field of the first data.

In the foregoing manner, the first AP can deliver a buffer indication to the second AP based on the first data, and does not need to send the buffer indication to the second AP separately, thereby effectively improving processing efficiency.

In a possible implementation, the joint transmission indication further includes one or a combination of the following: third identification information, which is indicative of the at least one third AP sending the second data, fourth identification information, which is indicative of a STA corresponding to the second data jointly transmitted by the at least one third AP, and a second data unit identifier, which is indicative of an MSDU in the second data sent by the at least one third AP, where the second data includes at least one MSDU.

In the foregoing manner, the first AP can flexibly select, based on a third identifier, the second AP participating in the joint transmission, and the first AP may instruct, based on a fourth identifier and/or the second data unit identifier, the second AP buffering the data to send only the data indicated in the joint transmission indication instead of sending all the buffered data, thereby reducing air interface overheads.

In a possible implementation, the sending module may be further configured to send a coordination set setup request frame to the at least one second AP, where the request frame includes an ID of a coordination set, an ID of the at least one second AP, and an ID of the first AP, and the processing module may be further configured to determine that the first AP and the at least one second AP have successfully set up the coordination set if a coordination set setup response frame sent by the at least one second AP is received.

In a possible implementation, the sending module may be further configured to send a buffer clearing indication to the at least one second AP, where the buffer clearing indication is used to instruct the at least one second AP to clear all or a part of the first data to be buffered by the at least one second AP.

In the foregoing manner, a load pressure of the second AP is reduced, and resource utilization is effectively improved.

According to a second aspect, an embodiment of this application provides a communications apparatus applied to a second AP, where the communications apparatus includes a receiving module, a buffer module, and a sending module. The receiving module may be configured to receive a buffer indication sent by a first AP, where the buffer indication is used to instruct at least one second AP to buffer first data sent by the first AP, the buffer module may be configured to buffer, based on the buffer indication, the first data sent by the first AP, where the first data includes data of at least one station STA, the receiving module may be further configured to receive a joint transmission indication sent by the first AP, where the joint transmission indication is used to instruct the at least one second AP to send second data to the at least one STA, and the second data is all or a part of the first data, and the sending module may be further configured to send the second data to the at least one STA based on the joint transmission indication, where a sending time at which the sending module sends the second data is the same as a sending time at which the first AP sends the second data.

In this application, the first AP sends the buffer indication to the second AP such that the second AP buffers data in the process in which the first AP sends the data to the at least one STA. Therefore, the delay can be reduced while the air interface resources occupied are reduced, and user experience is effectively improved.

In a possible implementation, the buffer indication may include first identification information indicative of the at least one second AP buffering the first data.

Based on the first identification information, the first AP can flexibly specify a second AP that needs to buffer the first data.

In a possible implementation, the buffer indication may include second identification information indicative of the at least one STA corresponding to the first data to be buffered by the at least one second AP, and correspondingly, the buffer module may be further configured to buffer, based on the buffer indication, data of at least one of the STA indicated by the second identification information in the first data.

In the foregoing manner, the second AP buffers the data of a specified STA, and does not need to buffer the data sent by the first AP to all STAs, thereby reducing memory overheads.

In a possible implementation, the first data may include at least one MAC service data unit MSDU, the buffer indication may include a first data unit identifier indicative of the at least one MSDU in the first data to be buffered by the at least one second AP, and correspondingly, the buffer module may be further configured to buffer, based on the buffer indication, the at least one MSDU indicated by the first data unit identifier in the first data.

In the foregoing manner, the second AP buffers a specified MSDU, thereby reducing memory overheads.

In a possible implementation, the first data unit identifier may include a traffic identifier of the at least one MSDU, a starting sequence number of the at least one MSDU, and a quantity of consecutive buffered MSDUs starting from an MSDU indicated by the starting sequence number.

In the foregoing manner, the second AP may buffer a plurality of consecutive MSDUs starting from the MSDU indicated by the starting sequence number, and does not need to buffer all the MSDUs such that the memory overheads are reduced. In addition, the first AP does not need to add sequence numbers of all the MSDUs that need to be buffered to the buffer indication such that signaling overheads are reduced.

In a possible implementation, the first AP and the at least one second AP belong to a same coordination set, and the first identification information is an ID of the coordination set.

In the foregoing manner, the first AP instructs, based on the coordination set, the second AP in the coordination set to buffer the first data such that the first AP can flexibly specify the second AP that needs to buffer the first data.

In a possible implementation, the buffer indication is included in a preamble of a physical layer protocol data unit (PPDU) carrying the first data, or the buffer indication is included in an A-Control field of the first data.

In the foregoing manner, the first AP can deliver a buffer indication to the second AP based on the first data, and does not need to send the buffer indication to the second AP separately, thereby effectively improving processing efficiency.

In a possible implementation, the joint transmission indication may further include one or a combination of the following: third identification information, which is indicative of the at least one second AP sending the second data, fourth identification information, which is indicative of a STA corresponding to the second data sent by the at least one second AP, and a second data unit identifier, which is indicative of at least one MSDU in the second data sent by the at least one second AP, where the second data includes the at least one MSDU.

In the foregoing manner, the first AP can flexibly select, based on a third identifier, the second AP participating in the joint transmission, and the first AP may instruct, based on a fourth identifier and/or the second data unit identifier, the second AP buffering the data to send only the data indicated in the joint transmission indication instead of sending all the buffered data, thereby reducing air interface overheads.

In a possible implementation, the receiving module may be further configured to receive a coordination set setup request frame sent by the first AP, where the request frame includes an ID of a coordination set, an ID of the at least one second AP, and an ID of the first AP, and the sending module may be further configured to send, to the first AP, a coordination set setup response frame indicative of that the first AP and the second AP have successfully set up the coordination set.

In a possible implementation, the communications apparatus may further include a clearing module configured to receive a buffer clearing indication sent by the first AP, and clear all or a part of the buffered first data based on the buffer clearing indication.

In the foregoing manner, a load pressure of the second AP is reduced, and resource utilization is effectively improved.

According to a third aspect, an embodiment of this application provides a joint transmission method. The joint transmission method may include that a first AP sends a buffer indication to at least one second AP, where the buffer indication is used to instruct the at least one second AP to buffer first data sent by the first AP, then the first AP sends the first data to at least one station STA, where the first data includes data of the at least one STA, then the first AP determines, based on a response frame returned by the at least one STA, whether a joint transmission procedure needs to be initiated. In addition, when the first AP determines to initiate the joint transmission procedure, the first AP sends a joint transmission indication to at least one third AP, where the joint transmission indication is used to instruct the at least one third AP to send second data to the at least one STA, the second data is all or a part of the first data, and the at least one third AP is one or more of the at least one second AP, then the first AP sends the second data, where a sending time at which the first AP sends the second data is the same as a sending time at which the at least one third AP sends the second data.

In this application, the first AP sends the buffer indication to the second AP such that the second AP buffers data in the process in which the first AP sends the data to the at least one STA. Therefore, the delay can be reduced while the air interface resources occupied are reduced, and user experience is effectively improved.

In a possible implementation, the buffer indication may include first identification information indicative of the at least one second AP buffering the first data.

Based on the first identification information, the first AP can flexibly specify a second AP that needs to buffer the first data.

In a possible implementation, the buffer indication may include second identification information indicative of the at least one STA corresponding to the first data to be buffered by the at least one second AP.

In the foregoing manner, the second AP buffers the data of a specified STA, and does not need to buffer the data sent by the first AP to all STAs, thereby reducing memory overheads.

In a possible implementation, the first data sent by the first AP includes at least one MAC service data unit MSDU, and the buffer indication may further include a first data unit identifier, which is indicative of the at least one MSDU in the first data to be buffered by the at least one second AP.

In the foregoing manner, the second AP buffers a specified MSDU, thereby reducing memory overheads.

In a possible implementation, the first data unit identifier may include a traffic identifier of the at least one MSDU, a starting sequence number of the at least one MSDU, and a quantity of consecutive buffered MSDUs starting from an MSDU indicated by the starting sequence number.

In the foregoing manner, the second AP may buffer a plurality of consecutive MSDUs starting from the MSDU indicated by the starting sequence number, and does not need to buffer all the MSDUs such that the memory overheads are reduced. In addition, the first AP does not need to add sequence numbers of all the MSDUs that need to be buffered to the buffer indication such that signaling overheads are reduced.

In a possible implementation, the first AP and the at least one second AP belong to a same coordination set, and in this implementation, the first identification information is an ID of the coordination set.

In the foregoing manner, the first AP instructs, based on the coordination set, the second AP in the coordination set to buffer the first data such that the first AP can flexibly specify the second AP that needs to buffer the first data.

In a possible implementation, the buffer indication is included in a physical layer preamble of the first data, or the buffer indication is included in an A-Control field of the first data.

In the foregoing manner, the first AP can deliver a buffer indication to the second AP based on the first data, and does not need to send the buffer indication to the second AP separately, thereby effectively improving processing efficiency.

In a possible implementation, the joint transmission indication further includes one or a combination of the following: third identification information, which is indicative of the at least one third AP sending the second data, fourth identification information, which is indicative of a STA corresponding to the second data jointly transmitted by the at least one third AP, and a second data unit identifier, which is indicative of an MSDU in the second data sent by the at least one third AP, where the second data includes at least one MSDU.

In the foregoing manner, the first AP can flexibly select, based on a third identifier, the second AP participating in the joint transmission, and the first AP may instruct, based on a fourth identifier and/or the second data unit identifier, the second AP buffering the data to send only the data indicated in the joint transmission indication instead of sending all the buffered data, thereby reducing air interface overheads.

In a possible implementation, before the first AP sends the buffer indication to the at least one second AP, the method may further include that the first AP sends a coordination set setup request frame to the at least one second AP, where the request frame includes an ID of a coordination set, an ID of the at least one second AP, and an ID of the first AP, and if the first AP receives a coordination set setup response frame sent by the at least one second AP, it is determined that the first AP and the at least one second AP have successfully set up the coordination set.

In a possible implementation, the method may further include that the first AP sends a buffer clearing indication to the at least one second AP, where the buffer clearing indication is used to instruct the at least one second AP to clear all or a part of the first data to be buffered by the at least one second AP.

In the foregoing manner, a load pressure of the second AP is reduced, and resource utilization is effectively improved.

According to a fourth aspect, an embodiment of this application provides a joint transmission method applied to a second AP. The joint transmission method may further include that the second AP receives a buffer indication sent by a first AP, where the buffer indication is used to instruct at least one second AP to buffer first data sent by the first AP, the second AP buffers, based on the buffer indication, the first data sent by the first AP, where the first data includes data of at least one station STA, the second AP receives a joint transmission indication sent by the first AP, where the joint transmission indication is used to instruct at least one second AP to send second data to the at least one STA, and the second data is all or a part of the first data, and the second AP sends the second data to the at least one STA based on the joint transmission indication, where a time at which the second AP sends the second data is the same as a time at which the first AP sends the second data.

According to the joint transmission method provided in this application, the first AP sends the buffer indication to the second AP such that the second AP buffers data in the process in which the first AP sends the data to the at least one STA. Therefore, the delay can be reduced while the air interface resources occupied are reduced, and user experience is effectively improved.

In a possible implementation, the buffer indication may include first identification information indicative of the at least one second AP buffering the first data.

Based on the first identification information, the first AP can flexibly specify a second AP that needs to buffer the first data.

In a possible implementation, the buffer indication may include second identification information indicative of the at least one STA corresponding to the first data to be buffered by the at least one second AP, and that the second AP buffers, based on the buffer indication, the first data sent by the first AP further includes that the second AP buffers, based on the buffer indication, data of at least one of the station STA indicated by the second identification information in the first data.

In the foregoing manner, the second AP buffers the data of a specified STA, and does not need to buffer the data sent by the first AP to all STAs, thereby reducing memory overheads.

In a possible implementation, the first data may include at least one MAC service data unit MSDU, the buffer indication may include a first data unit identifier indicative of the at least one MSDU in the first data to be buffered by the at least one second AP, and that the second AP buffers, based on the buffer indication, the first data sent by the first AP further includes that the second AP buffers, based on the buffer indication, the at least one MSDU indicated by the first data unit identifier in the first data.

In the foregoing manner, the second AP buffers a specified MSDU, thereby reducing memory overheads.

In a possible implementation, the first data unit identifier may include a traffic identifier of the at least one MSDU, a starting sequence number of the at least one MSDU, and a quantity of consecutive buffered MSDUs starting from an MSDU indicated by the starting sequence number.

In the foregoing manner, the second AP may buffer a plurality of consecutive MSDUs starting from the MSDU indicated by the starting sequence number, and does not need to buffer all the MSDUs such that the memory overheads are reduced. In addition, the first AP does not need to add sequence numbers of all the MSDUs that need to be buffered to the buffer indication such that signaling overheads are reduced.

In a possible implementation, the first AP and the at least one second AP belong to a same coordination set, and the first identification information is an ID of the coordination set.

In the foregoing manner, the first AP instructs, based on the coordination set, the second AP in the coordination set to buffer the first data such that the first AP can flexibly specify the second AP that needs to buffer the first data.

In a possible implementation, the buffer indication is included in a preamble of a PPDU carrying the first data, or the buffer indication is included in an A-Control field of the first data.

In the foregoing manner, the first AP can deliver a buffer indication to the second AP based on the first data, and does not need to send the buffer indication to the second AP separately, thereby effectively improving processing efficiency.

In a possible implementation, the joint transmission indication may further include one or a combination of the following: third identification information, which is indicative of the at least one second AP sending the second data, fourth identification information, which is indicative of a STA corresponding to the second data sent by the at least one second AP, and a second data unit identifier, which is indicative of at least one MSDU in the second data sent by the at least one second AP, where the second data includes the at least one MSDU.

In the foregoing manner, the first AP can flexibly select, based on a third identifier, the second AP participating in the joint transmission, and the first AP may instruct, based on a fourth identifier and/or the second data unit identifier, the second AP buffering the data to send only the data indicated in the joint transmission indication instead of sending all the buffered data, thereby reducing air interface overheads.

In a possible implementation, before the first AP sends the buffer indication to the at least one second AP, the method may further include that the second AP receives a coordination set setup request frame sent by the first AP, where the request frame includes an ID of a coordination set, an ID of the at least one second AP, and an ID of the first AP, and the second AP sends, to the first AP, a coordination set setup response frame indicative of that the first AP and the second AP have successfully set up the coordination set.

In a possible implementation, the method may further include that the second AP receives a buffer clearing indication sent by the first AP, and the second AP clears all or a part of the buffered first data based on the buffer clearing indication.

In the foregoing manner, a load pressure of the second AP is reduced, and resource utilization is effectively improved.

According to a fifth aspect, an embodiment of this application provides a communications apparatus on a first access point side. The apparatus may be a first access point or a chip in the first access point. The apparatus has a function of implementing the first access point used in the first aspect. The function may be implemented by hardware, or may be implemented by hardware by executing corresponding software. The hardware or software includes one or more units corresponding to the foregoing function.

In a possible implementation, when the apparatus is a first access point, the first access point includes a processor and a transceiver, where the processor is configured to support the first AP in performing corresponding functions in the foregoing aspects, and the transceiver is configured to support communication between the first AP and a second AP, and send information or instructions used in the foregoing methods to the second access point. Optionally, the first access point may further include a memory, where the memory is configured to couple to the processor, and the memory stores necessary program instructions and data for the first access point.

In a possible implementation, the apparatus includes a processor, a baseband circuit, a radio frequency circuit, and an antenna, where the processor is configured to control a function of each circuit part, and the baseband circuit is configured to generate various types of signaling and messages (such as a buffer indication message), and send the signaling and messages to the second AP through an antenna after the radio frequency circuit performs processing such as analog conversion, filtering, amplification, and up-conversion on the signaling and messages. Optionally, the apparatus may further include a memory, where the memory stores necessary program instructions and data for the first access point.

In a possible implementation, the apparatus may include a processor and a modem, where the processor may be configured to execute instructions or run an operating system in order to control a function of the first access point, and the modem may perform encapsulation, encoding/decoding, modulation/demodulation, equalization, and the like on data based on a protocol to generate signaling information (such as a buffer indication and a joint transmission indication) in order to support the first AP in performing corresponding functions in the first aspect.

In a possible implementation, when the apparatus is a chip in the first access point, the chip includes a processing module and a transceiver module. The processing module may be, for example, a processor. For example, the processor is configured to generate various types of messages and signaling, encapsulate the various types of messages based on a protocol, and then perform processing such as encoding, modulation, and amplification on the various types of messages, and the processor may be further configured to perform demodulation, decoding, and decapsulation to obtain signaling and messages. The transceiver module may be, for example, an input/output interface, a pin, or a circuit on the chip. The processing module may execute computer-executable instructions stored in a storage unit in order to support the first AP in performing corresponding functions in the foregoing aspects. Optionally, the storage unit may be a storage unit on the chip, such as a register or a buffer, or the storage unit may be a storage unit located outside the chip in the first access point, such as a read-only memory (ROM), another type of static storage device capable of storing static information and instructions, or a random-access memory (RAM).

In a possible implementation, the apparatus includes a processor, where the processor is configured to couple to a memory, read instructions in the memory, and perform, based on the instructions, the method of the first AP used in the first aspect. The memory may be located inside the processor, or may be located outside the processor.

Any one of the above-mentioned processors may be a general-purpose central processing unit (CPU), a microprocessor, an application-specific integrated circuit (ASIC), or one or more integrated circuits for controlling program execution of the joint transmission methods according to the foregoing aspects.

According to a sixth aspect, this application provides a communications apparatus on a second access point side, where the apparatus may be a second access point or a chip in the second access point. The apparatus has a function of implementing the second access point used in the second aspect. The function may be implemented by hardware, or may be implemented by hardware by executing corresponding software. The hardware or software includes one or more units corresponding to the foregoing function.

In a possible implementation, when the apparatus is a second access point, the second access point includes a processor and a transceiver, where the processor is configured to support the second AP in performing the corresponding functions in the foregoing methods, and the transceiver is configured to support communication between the second AP and the second AP or a station, and receive information or instructions sent by the second access point in the foregoing methods, such as a buffer indication or a joint transmission indication. Optionally, the second access point may further include a memory, where the memory is configured to couple to the processor, and the memory stores necessary program instructions and data for the second access point.

In a possible implementation, the apparatus includes a processor, a baseband circuit, a radio frequency circuit, and an antenna, where the processor is configured to control a function of each circuit part, and the radio frequency circuit may perform processing such as digital conversion, filtering, amplification, and down-conversion on a data packet (such as a data packet carrying a buffer indication) that is sent by the first access point and that is received through the antenna such that the baseband circuit can perform decoding and decapsulation based on a protocol to obtain signaling information. Optionally, the apparatus further includes a memory, where the memory stores necessary program instructions and data for the second access point.

In a possible implementation, the apparatus includes a processor and a modem, where the processor may be configured to execute instructions or run an operating system in order to control a function of the second access point, and the modem may perform encapsulation, encoding/decoding, modulation/demodulation, equalization, and the like on data based on a protocol to generate second data, or may parse a buffer indication, a joint transmission indication, or the like in order to support the second AP in performing corresponding functions in the second aspect.

In a possible implementation, when the apparatus is a chip in the second access point, the chip includes a processing module and a transceiver module. The processing module may be, for example, a processor, and the processor may be configured to perform processing such as filtering, demodulation, power amplification, and decoding on a data packet that is received by the transceiver module and that carries signaling or data information (for example, a data packet including a scheduling request message). The transceiver module may be, for example, an input/output interface, a pin, or a circuit on the chip. The processing module may execute computer-executable instructions stored in a storage unit in order to support the second AP in performing corresponding functions in the fourth aspect. Optionally, the storage unit may be a storage unit on the chip, such as a register or a buffer, or the storage unit may be a storage unit located outside the chip in the second access point, such as a ROM, another type of static storage device capable of storing static information and instructions, or a RAM.

In a possible implementation, the apparatus includes a processor, where the processor is configured to couple to a memory, read instructions in the memory, and perform, based on the instructions, the functions according to the second aspect. The memory may be located inside the processor, or may be located outside the processor.

Any one of the above-mentioned processors may be a general-purpose CPU, a microprocessor, an ASIC, or one or more integrated circuits for controlling program execution of the spatial multiplexing methods according to the foregoing aspects.

According to a seventh aspect, this application provides a computer-readable storage medium, where the computer-readable storage medium stores an instruction, and the instruction may be executed by one or more processors on a processing circuit, and when the instruction is run on a computer, the computer is enabled to perform the method according to the third aspect or the fourth aspect, or any possible implementation of the third aspect or the fourth aspect.

According to an eighth aspect, a computer program product including an instruction is provided, where when the computer program product runs on a computer, the computer is enabled to perform the method according to the third aspect or the fourth aspect, or any possible implementation of the third aspect or the fourth aspect.

According to a ninth aspect, this application provides a chip system, where the chip system includes a processor configured to support a data sending device in performing functions used in the foregoing aspect, such as generating or processing data and/or information used in the foregoing aspects. In a possible design, the chip system further includes a memory, where the memory is configured to store necessary program instructions and data for the data sending device. The chip system may include a chip, or may include a chip and another discrete device.

According to a tenth aspect, an embodiment of this application provides a wireless communications system, where the system includes the first access point and the at least one second access point used in the foregoing aspects.

BRIEF DESCRIPTION OF DRAWINGS

To describe the technical solutions in some of the embodiments of this application more clearly, the following briefly describes the accompanying drawings describing some of the embodiments of this application. The accompanying drawings in the following description show merely some embodiments of this application, and a person of ordinary skill in the art may still derive other drawings from these accompanying drawings without creative efforts.

FIG. 13 is a third schematic diagram of a frame structure of a coordination set request frame according to an embodiment of this application;

DESCRIPTION OF EMBODIMENTS

The following clearly and completely describes the technical solutions in the embodiments of this application with reference to the accompanying drawings in the embodiments of this application. The described embodiments are merely some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: only A exists, both A and B exist, and only B exists.

In the specification and claims in the embodiments of this application, the terms "first", "second", and so on are intended to distinguish between different objects but do not indicate a particular order of the objects. For example, a first target object and a second target object are used to distinguish between different target objects, and are not used to describe a specific order of the target objects.

In addition, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a relative concept in a specific manner.

In the description of the embodiment of this application, unless otherwise stated, "a plurality of" means two or more than two. For example, a plurality of processing units are two or more processing units, and a plurality of systems are two or more systems.

Figure 1:
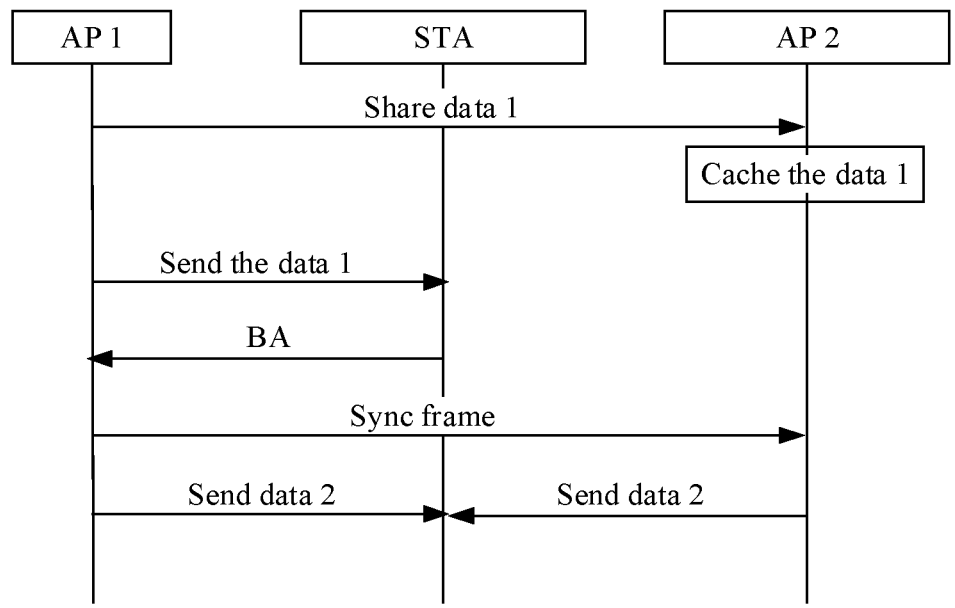
FIG. 1 is a schematic flowchart of an example of a joint transmission method.

FIG. 1 is a schematic flowchart of a joint transmission method. The method is as follows.

AP 1 and AP 2 are coordinated APs. If AP 1 needs to send data to a STA, AP 1 shares the data (the data sent by AP 1 to AP 2 is referred to as data 1 for distinguishing from retransmitted data) with AP 2 in advance in a wired or wireless manner, and AP 2 locally buffers the data 1. Subsequently, AP 1 sends the data 1 to the STA. AP 1 waits for a response frame (block acknowledgement (BA) frame) of the STA. If the response frame indicates a data reception error of the STA, for example, data missing, AP 1 sends a synchronization frame (sync frame) to AP 2 based on the indication in the response frame to notify AP 2 of data that needs to be sent to the STA. It should be noted that, in another embodiment, the sync frame may also be referred to as a control frame, a management frame, or the like. Then, at a specified time after the end of the sync frame, AP 1 and AP 2 jointly send (that is, both AP 1 and AP 2 send data to the STA at the specified time) required data (that is, the data 2, where the data 1 and the data 2 may be the same or different) to the STA. Subsequently, the STA returns a response frame again to confirm whether the data 2 is successfully received.

In a coordination method according to other approaches embodiment, a master AP (that is, AP 1) needs to send data to a coordinated AP (that is, AP 2) in advance, and then send the data to the STA, and then a joint transmission procedure needs to be performed with the coordinated AP. However, if the master AP shares the data with the coordinated AP in a wired manner, a large quantity of air interface resources is occupied due to a large amount of transmitted data. If the data is shared with the coordinated AP in a wireless manner, a millisecond-level delay occurs when the data is transmitted to the STA, which seriously affects the quality of service (QoS)/quality of experience (QoE) and increases network load.

This application provides a joint transmission method to eliminate the foregoing disadvantages in the other approaches.

Figure 2:
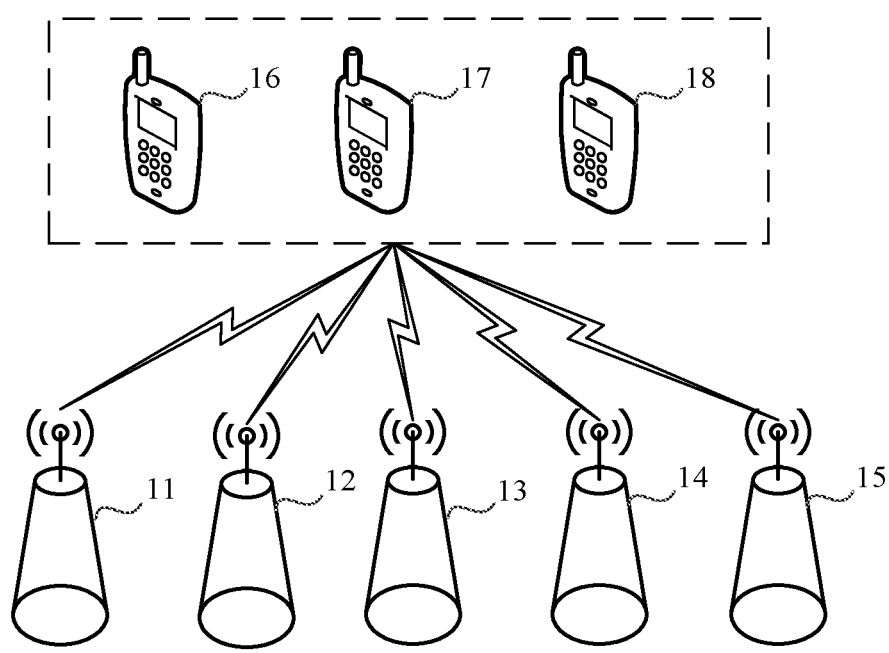
FIG. 2 is a schematic diagram of an application scenario according to an embodiment of this application.

Before the technical solutions in the embodiments of this application are described, an application scenario of the embodiments of this application is first described with reference to the accompanying drawings. FIG. 2 is a schematic diagram of an application scenario according to an embodiment of this application. The application scenario includes APs 1-5 (where APs 1-5 include AP 1, AP 2, AP 3, AP 4, and AP 5), and reference numerals of APs 1-5 are 11, 12, 13, 14, and 15 in sequence in the figure, and further includes STAs 1-3 (where STAs 1-3 include STA 1, STA 2, and STA 3), and reference numerals of STAs 1-3 are 16, 17, and 18 in sequence in the figure. During specific implementation of this embodiment of this application, STAs 1-3 each may be a computer, a smartphone, or the like. It should be noted that, in actual application, there may be one or more APs and STAs. A quantity of STAs and a quantity of APs in the application scenario shown in FIG. 2 are merely illustrative examples.

With reference to the schematic diagram of the application scenario shown in FIG. 2, specific implementations of this application are described below. In the following scenario, an example in which AP 1 is a first AP in the embodiments of this application, APs 2-4 are second APs in the embodiments of this application, and AP 2 is a third AP in the embodiments of this application is used for detailed description. It should be noted that, in the embodiments of this application, the first AP may be any AP in FIG. 2, and the second AP may be any AP other than the first AP in FIG. 2.

With reference to the application scenario shown in FIG. 2, AP 1 may send a buffer indication to APs 2-4 using a plurality of methods. In an embodiment, AP 1 may send a buffer indication frame carrying a buffer indication to APs 2-4 to instruct APs 2-4 to buffer first data sent by AP 1 to STAs 1-3. Specific details of this embodiment can be found in Scenario 2.

In another embodiment, AP 1 may send first data carrying a buffer indication to APs 2-4 to instruct APs 2-4 to buffer first data sent by AP 1 to STAs 1-3. Specific details of this embodiment can be found in Scenario 3.

In still another embodiment, AP 1 may set up a coordination relationship with APs 2-4. When setting up the coordination relationship, AP 1 may send a coordination set setup request carrying a buffer indication to APs 2-4 to instruct APs 2-4 to buffer first data sent by AP 1 to STAs 1-3. Specific details of this embodiment can be found in Scenario 4.

In yet another embodiment, AP 1 may set up a coordination relationship with APs 2-4. After setting up the coordination relationship, AP 1 may send a buffer indication frame carrying a buffer indication (information carried in the buffer indication is different from information carried in the buffer indication in Scenario 2) to APs 2-4 to instruct APs 2-4 to buffer first data sent by AP 1 to STAs 1-3. Specific details of this embodiment can be found in Scenario 5.

In still yet another embodiment, AP 1 may set up a coordination relationship with APs 2-4. After setting up the coordination relationship, AP 1 may send first data carrying a buffer indication (information carried in the buffer indication in this scenario is different from information carried in the buffer indication in Scenario 3) to APs 2-4 to instruct APs 2-4 to buffer first data sent by AP 1 to STAs 1-3. Specific details of this embodiment can be found in scenario 6.

Figure 3:
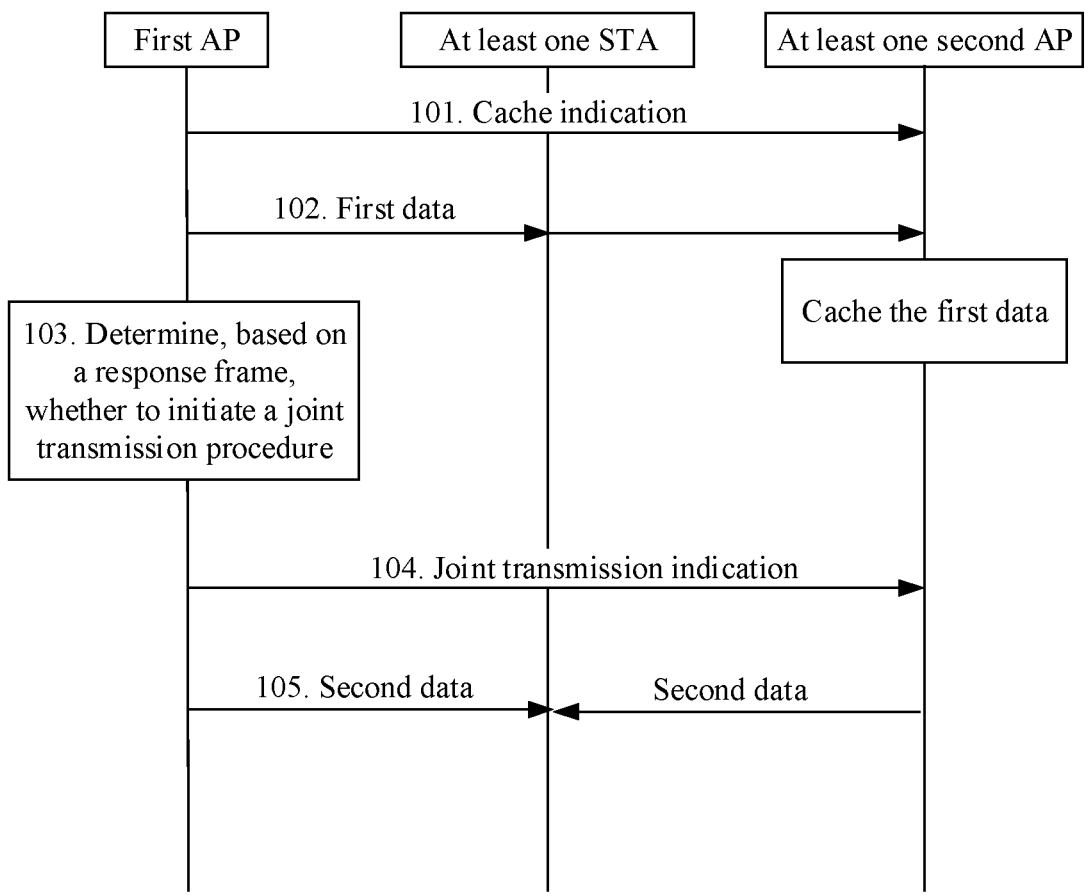
FIG. 3 is a first flowchart of a joint transmission method according to an embodiment of this application.

Scenario 1:

FIG. 3 is a flowchart of a joint transmission method according to an embodiment of this application. In FIG. 3, the joint transmission method includes the following steps.

S101. A first AP sends a buffer indication to at least one second AP.

Further, in this embodiment of this application, the buffer indication is used to instruct the at least one second AP to buffer first data sent by the first AP. The first AP may send the buffer indication to the at least one second AP through unicast or broadcast in order to instruct, based on the buffer indication, the at least one second AP to listen on a channel and to buffer the first data when detecting data indicated in the buffer indication, that is, the first data sent by the first AP.

In this embodiment of this application, parameters included in the buffer indication may include one or a combination of the following:

1. Identification information of a second AP, which is indicative of the at least one second AP that needs to buffer the first data. In this embodiment of this application, the identification information of the at least one second AP may be MAC address information of the AP. For example, if AP 1 instructs APs 2-5 to buffer the first data, the MAC addresses of APs 2-5 may be included in the buffer indication.

2. Identification information of at least one STA, which is indicative of STAs to which the data that needs to be buffered by the second AP is sent by the first AP. The identification information of a STA is used to uniquely identify a corresponding STA. In an embodiment, the identification information of the STA may be MAC address information of the STA. In another embodiment, the identification information of the STA may alternatively be an association identifier (AID) of the STA. For example, if AP 1 sends a buffer indication carrying the identification information of STAs 1-3 to APs 2-5, APs 2-5 buffer the data sent by AP 1 to STAs 1-3. In this way, the second AP that receives the buffer indication can determine, based on the identification information, the STAs whose data needs to be buffered by the second AP such that the second AP does not need to buffer the data of all STAs in the first data, thereby reducing memory overheads of the second AP.

3. First data unit identification information. In this embodiment of this application, the first data includes at least one MSDU. The first data unit identification information may be indicative of a data unit that needs to be buffered by the second AP. The first data unit identification information may include a traffic identifier (TID) of the at least one MSDU, a starting sequence number of the at least one MSDU, and a quantity of consecutive buffered MSDUs starting from an MSDU indicated by the starting sequence number. The TID is used to identify an MSDU. The starting sequence number is indicative of the starting sequence number of the MSDUs that need to be buffered. The starting sequence number and the quantity of MSDUs can be used together to indicate the MSDUs to be buffered by the second AP. For example, data sent by AP 1 to STA 1 includes TID1 and TID2, where TID1 and TID2 each include MSDU 1, MSDU 2, MSDU 3, and MSDU 4. If a TID in a data unit identifier in the buffer indication sent by AP 1 to APs 2-4 is TID1, the starting sequence number is 1, and the quantity of MSDUs is 4, APs 2-4 buffer MSDUs 1-4 in TID1. Therefore, the second AP buffers only a specified data unit, thereby further reducing the memory overheads of the second AP.

The parameters included in the buffer indication are described in detail below with reference to the application scenario shown in FIG. 2.

In an embodiment, if a buffer indication sent by AP 1 to APs 2-5 includes MAC address information of APs 2-4, APs 2-4 buffer data sent by AP 1.

In another embodiment, if a buffer indication sent by AP 1 to APs 2-5 includes MAC address information of APs 2-4 and MAC address information of STAs 1 and 2, APs 2-4 buffer data sent by AP 1 to STA 1 and STA 2.

In still another embodiment, if a buffer indication sent by AP 1 to APs 2-5 includes MAC address information of APs 2-4, MAC address information of STA 1 and STA 2, and data unit identification information, and parameters in the data unit identification information are as follows: a TID is 1, a starting sequence number is 1, and a quantity of MSDUs is 4, APs 2-4 buffer MSDUs 1-4 in TID1 in data sent by AP 1 to STA 1 and STA 2.

S102. The first AP sends the first data to the at least one STA.

Further, in this embodiment of this application, AP 1 sends the first data to STAs 1-3. In this embodiment of this application, the first data sent by AP 1 to STAs 1-3 includes information such as transmission address information and reception address information, and a data part. The data part includes at least data of STAs 1-3.

S103. The first AP determines, based on a response frame returned by the at least one STA, whether a joint transmission procedure needs to be initiated. Further, the first AP may determine, based on the response frame, whether the data received by the at least one STA is correct in order to determine whether the joint transmission procedure needs to be initiated. In this embodiment of this application, after receiving the first data sent by AP 1, STAs 1-3 detect whether the received data is complete. For a specific detection method, reference may be made to a technical solution in the other approaches embodiment. Details are not described in this application.

In an embodiment of this application, STAs 1-3 return a response frame to AP 1 after receiving the first data. Using STA 1 as an example, in an embodiment, if STA 1 detects an error in the received first data, the response frame carries information indicating the data error. The data error may include incomplete data reception. For example, if AP 1 indicates that the first data includes MSDUs 1-4 using a control field in the data frame to which the first data belongs, but STA 1 actually receives only MSDUs 1-3, it can be determined that the received data is incomplete. The data error may be alternatively a data reception order error. For example, the first data sent by AP 1 to STAs 1-3 includes MSDUs 1-4. When STA 1 receives the data, if the data order is MSDUs 1,3,2, and 4, STA 1 determines that the data reception order is incorrect. The data error may alternatively be of another type. Not all examples are described in this application. In addition, in an embodiment of this application, the response frame returned by STA 1 to the first AP may specify data that is incorrectly received. For example, if data sent by AP 1 to STA 1 includes MSDUs 1-4, but STA 1 receives only MSDUs 2 and 4, the response frame returned by STA 1 to AP 1 indicates that MSDUs 2 and 4 are received correctly and MSDUs 1 and 3 are received incorrectly. In another embodiment, if STA 1 detects that all the data is received correctly, the response frame carries corresponding indication information.

In this embodiment of this application, AP 1 may determine, based on response frames returned by STAs 1-3, whether the joint transmission procedure needs to be initiated. For example, if AP 1 determines, based on the received response frames returned by STAs 1-3, that a data reception error has occurred on STA 1 and STA 2, AP 1 determines that the joint transmission procedure needs to be initiated. If AP 1 determines that no data reception error has occurred, AP 1 determines that the joint transmission procedure does not need to be initiated.

S104. The first AP sends, based on the response frame, a joint transmission indication to at least one third AP.

Further, the joint transmission indication is used to instruct the at least one third AP to send second data to the at least one STA, where the second data may be all or a part of the first data, and, in this embodiment of this application, the at least one third AP may be one or more of the at least one second AP.

Parameters in the joint transmission indication may include, but are not limited to, one or a combination of the following:

1. Third identification information, which is indicative of the at least one third AP sending the second data. For example, if AP 1 sends a joint transmission indication carrying MAC address information of AP 2 to APs 2-5, AP 2 sends the second data together with AP 1.

2. Fourth identification information, which is indicative of a STA corresponding to the second data sent by the at least one third AP. For example, if AP 1 sends a joint transmission indication carrying MAC address information of STA 1 and STA 2 to APs 2-5, APs 2-5 send the second data to STA 1 and STA 2 together with AP 1. In this way, the third AP can send data to a specified STA, thereby reducing the air interface resources occupied.

3. A second data unit identifier, which is indicative of an MSDU in the second data sent by the at least one third AP. In an embodiment of this application, the second data includes at least one MSDU. The joint transmission indication includes, but is not limited to, identification information of at least one STA, TID, starting sequence number, sata bitmap, and transmission parameters. The transmission parameters include, but are not limited to, parameter information such as a bandwidth, a quantity of space-time streams, a guard interval, a modulation and coding scheme, and a scrambling seed. For example, in a joint transmission indication sent by AP 1 to AP 2, identification information of the STA is MAC address information of STA 1 and STA 2. TID is TID1 (that is, first data), starting sequence number is 1, and data bitmap is 1000. "1" in data bitmap indicates that a corresponding MSDU is successfully received, and "0" indicates that a corresponding MSDU fails to be received. Therefore, if data bitmap is "1000", it indicates that, in MSDUs 1-4 in TID1, MSDU 1 is successfully transmitted, and MSDUs 2-4 fail to be transmitted. After receiving the joint transmission indication, AP 2 determines that AP 2 needs to send the second data, that is, the MSDUs 2-4 in TID1, to STA 1 and STA 2 together with AP 1 at the same time.

4. Other transmission parameters, including parameters required for generating the second data by the third AP and/or parameters required for sending the second data by the third AP. The transmission parameters may include, but are not limited to, parameter information such as a transmission bandwidth, a quantity of space-time streams, a guard interval, a modulation and coding scheme, and a scrambling seed.

Further, in one example of this embodiment of this application, for example, if AP 1 determines that a data reception error has occurred on STA 1 and STA 2, AP 1 sends a joint transmission indication to one or more APs in APs 2-4 that have buffered data of STA 1 and STA 2. In this embodiment and the following embodiments, an example in which AP 1 sends a joint transmission indication to AP 2 is used for detailed description, that is, AP 1 sends a joint transmission indication carrying MAC address information of AP 2 and MAC address information of STA 1 and STA 2 to AP 2.

S105. The first AP and the at least one third AP jointly send the second data. Further, in this embodiment of this application, joint transmission means that the first AP and the at least one third AP jointly send same data, that is, the second data in this embodiment of this application, to the at least one STA at the same time. For example, AP 1 sends a joint transmission indication to AP 2 to instruct AP 2 that a joint transmission procedure is to be initiated. That is, as in the foregoing other approaches embodiment, after receiving the joint transmission indication, AP 2 and AP 1 simultaneously send the second data specified in the joint transmission indication to STA 1 and STA 2 at a specified time, thereby implementing the joint transmission. In this embodiment of this application, the second data may be all or a part of the first data.

It should be noted that, based on an operating principle of a transceiver, "simultaneous" in this embodiment of this application is substantially "at the same time", "simultaneous" and "same sending time" do not mean that there is no difference between a sending time of the second data sent by the first AP and a sending time of the second data sent by the second AP, but mean that the foregoing processing is essentially performed at the same time dimension. In addition, in the solution in this embodiment of this application, the first AP and the at least one second AP send the second data "simultaneously" such that a receive power of a receive end can be increased, received signal quality of a receiving station can be improved, and interference caused by asynchronous transmission to the station receiving the second data is avoided. This is advantageous.

In this embodiment of this application, the specified time may also be a time agreed by all APs in a system. In an embodiment, the specified time may be a time after a short interframe space (SIFS) after a joint transmission indication is sent by the first AP. The specified time may also be carried in the joint transmission indication, and is indicated, in an explicit manner, to the third AP needing to perform joint transmission such that the third AP determines a transmission time of the joint transmission of the second data. In addition, to some extent, the first AP may control a transmission time of an air interface used for joint transmission.

In this embodiment of this application, after receiving the data jointly transmitted by AP 1 and AP 2, STA 1 and STA 2 may return a response frame to AP 1 again, and then AP 1 may determine, based on the response frame, whether the joint transmission procedure needs to be continuously initiated, that is, whether S104 and S105 need to be performed cyclically until the response frame returned by STA 1 and STA 2 indicates that all the data is successfully received. In this embodiment of this application, if AP 1 determines that the joint transmission procedure needs to be continuously initiated, AP 1 may also select another AP (for example, AP 3) other than AP 2 from the APs (that is, APs 2-5) that have buffered the first data of STAs 1-3 to perform the joint transmission procedure with AP 1, thereby avoiding a joint transmission failure due to an error on the AP 2 side.

In summary, according to the joint transmission method provided in this embodiment of this application, the first AP sends a buffer indication to the at least one second AP to instruct the at least one second AP to buffer the data sent by the first AP such that the delay is not affected while the air interface resources occupied are effectively reduced, thereby improving user experience.

Figures 4, 5:
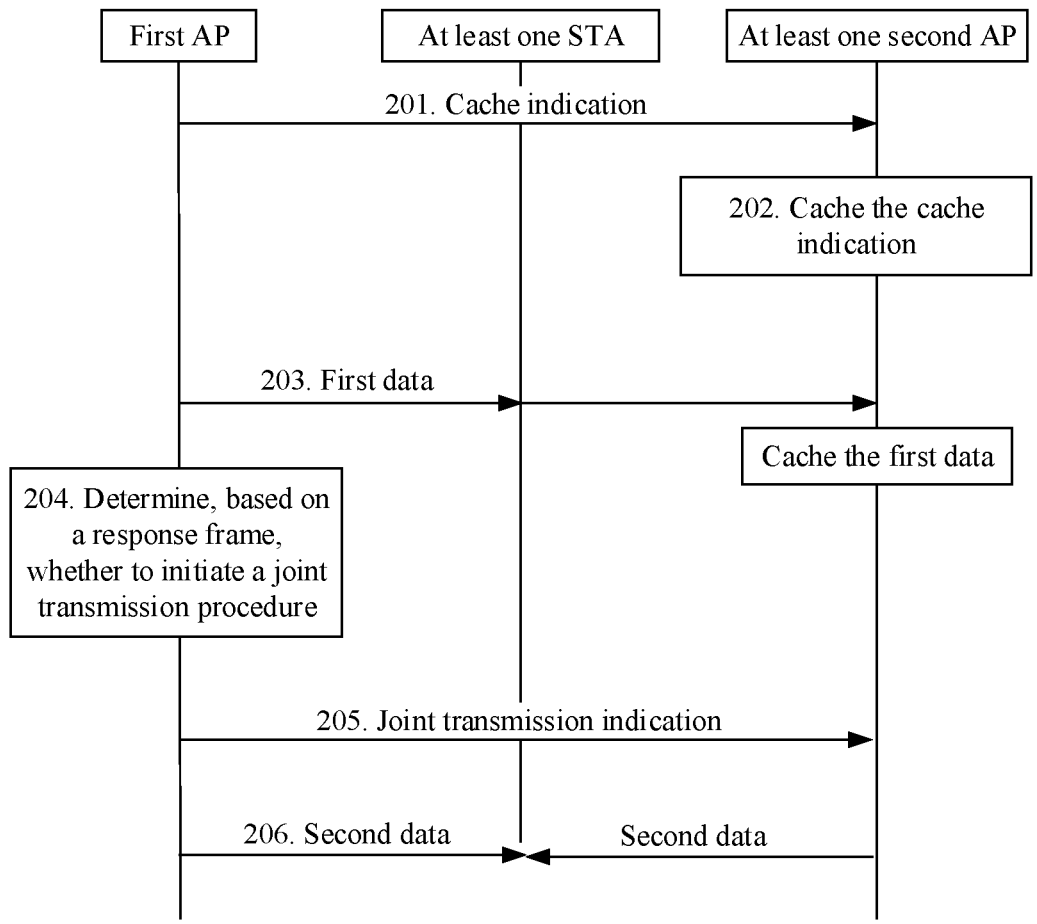
FIG. 4 is a second flowchart of a joint transmission method according to an embodiment of this application.
FIG. 5 is a schematic diagram of a frame structure of a buffer indication according to an embodiment of this application.

Scenario 2:

With reference to FIG. 2, FIG. 4 is a flowchart of a joint transmission method according to an embodiment of this application. In FIG. 4, the joint transmission method includes the following steps.

S201. A first AP sends a buffer indication to at least one second AP. Further, in this embodiment, the buffer indication includes, but is not limited to, one or a combination of the following: identification information of at least one second AP, identification information of at least one STA, and first data unit identification information.

In this embodiment, detailed description is given based on an example in which a TID of the first data is TID1, the first data includes MSDU 1, MSDU 2, MSDU 3, and MSDU 4, and the buffer indication includes MAC address information of APs 2-4, MAC address information of STAs 1-3, and a first data unit identifier, where a TID in the first data unit identifier is TID1, a starting sequence number of the first MSDU is 1, and a quantity of MSDUs is 4. Further, AP 1 sends a SyncForBuffer (that is, a buffer indication in this embodiment of this application) frame to APs 2-4, and a frame structure of the SyncForBuffer frame is shown in FIG. 5.

In this embodiment, after sending the buffer indication, AP 1 may record the MAC address information of APs 2-4, the MAC address information of STAs 1-3, and the data unit identifier in a local list correspondingly such that AP 1 can search the local list to determine which APs have buffered which MSDUs in the first data sent to STAs 1-3.

S202. The at least one second AP buffers the information in the buffer indication. Further, using AP 2 receiving the buffer indication as an example, after receiving the SyncForBuffer frame sent by AP 1, AP 2 reads AP identification information carried in the SyncForBuffer frame, and after determining that the SyncForBuffer frame includes the MAC address information of AP 2, buffers the address information of AP 1 carried in the SyncForBuffer frame (in this embodiment of this application, the address information of AP 1 may be IP address information or MAC address information of AP 1, and in this embodiment and the following embodiments, detailed description is given based on an example in which the address information of AP 1 is the MAC address information), the MAC address information of STAs 1-3 included in the SyncForBuffer frame, and the first data unit identifier. On the contrary, after receiving the buffer indication, AP 5 determines that the SyncForBuffer frame does not include the MAC address information of AP 5, and therefore does not need to buffer the address information of AP 1 carried in the SyncForBuffer frame.

S203. The first AP sends the first data to the at least one STA.

Further, in this embodiment, AP 1 sends the first data to STAs 1-3, where the first data sent by AP 1 to STAs 1-3 carries the transmission address information and the reception address information. Detailed description is given below based on an example in which AP 1 sends the first data to STA 1. Further, AP 1 sends the first data to STA 1, where the first data carries transmission address information (that is, the MAC address information of AP 1) and reception address information (that is, the MAC address information of STA 1).

APs 2-5 listen on a channel in real time. In this embodiment, all of APs 2-5 detect the first data. APs 2-5 read reception address information and transmission address information in the first data, and perform matching between the reception address information and the transmission address information and locally buffered information (that is, the information stored in step S202). An example in which APs 2-4 buffer data of STA 1 in the first data is used for description. In this embodiment, APs 2-4 have locally buffered related information in step S202, including the MAC address information of AP 1, the address information of STAs 1-3, and the first data unit identifier, where the TID in the first data unit identifier is TID1, the starting sequence number of the first MSDU is 1, and the quantity of MSDUs is 4. APs 2-4 perform matching between the reception address information (the MAC address information of STA 1) and the transmission address information (the MAC address information of AP 1) in the read first data and locally stored parameters, and the matching succeeds. In this embodiment, because AP 5 does not locally store the foregoing parameters (that is, the MAC address information of AP 1 and the MAC address information of STA 1), AP 5 fails to match the reception address information and the transmission address information in the read first data with the locally buffered parameters, and AP 5 does not perform any processing.

Next, APs 2-4 buffer MSDUs 1-4 with TID "1" in the first data as indicated by the first data unit identifier included in the first data. It can be understood that a case in which APs 2-4 buffer the data of STA 2 or STA 3 in the first data is similar to the case in which APs 2-4 buffer the data of STA 1 in the first data. Details are not described herein again.

S204. The first AP determines, based on a response frame returned by the at least one STA, whether a joint transmission procedure needs to be initiated. In this embodiment and the following embodiments, detailed description is given based on an example in which STA 3 receives data correctly, and a data reception error occurs on STA 1 and STA 2, where the specific data error is as follows. The first data includes MSDUs 1-4, but only MSDU 1 is received by STA 1 and STA 2.

Further, AP 1 receives response frames returned by STA 1 and STA 2, and the response frames each indicate that MSDUs 2-4 in the first data are received incorrectly. Therefore, AP 1 determines that the joint transmission procedure needs to be initiated. AP 1 determines, by searching the local list, that APs 2-4 have buffered the first data sent to STA 1 and STA 2.

Figure 6:
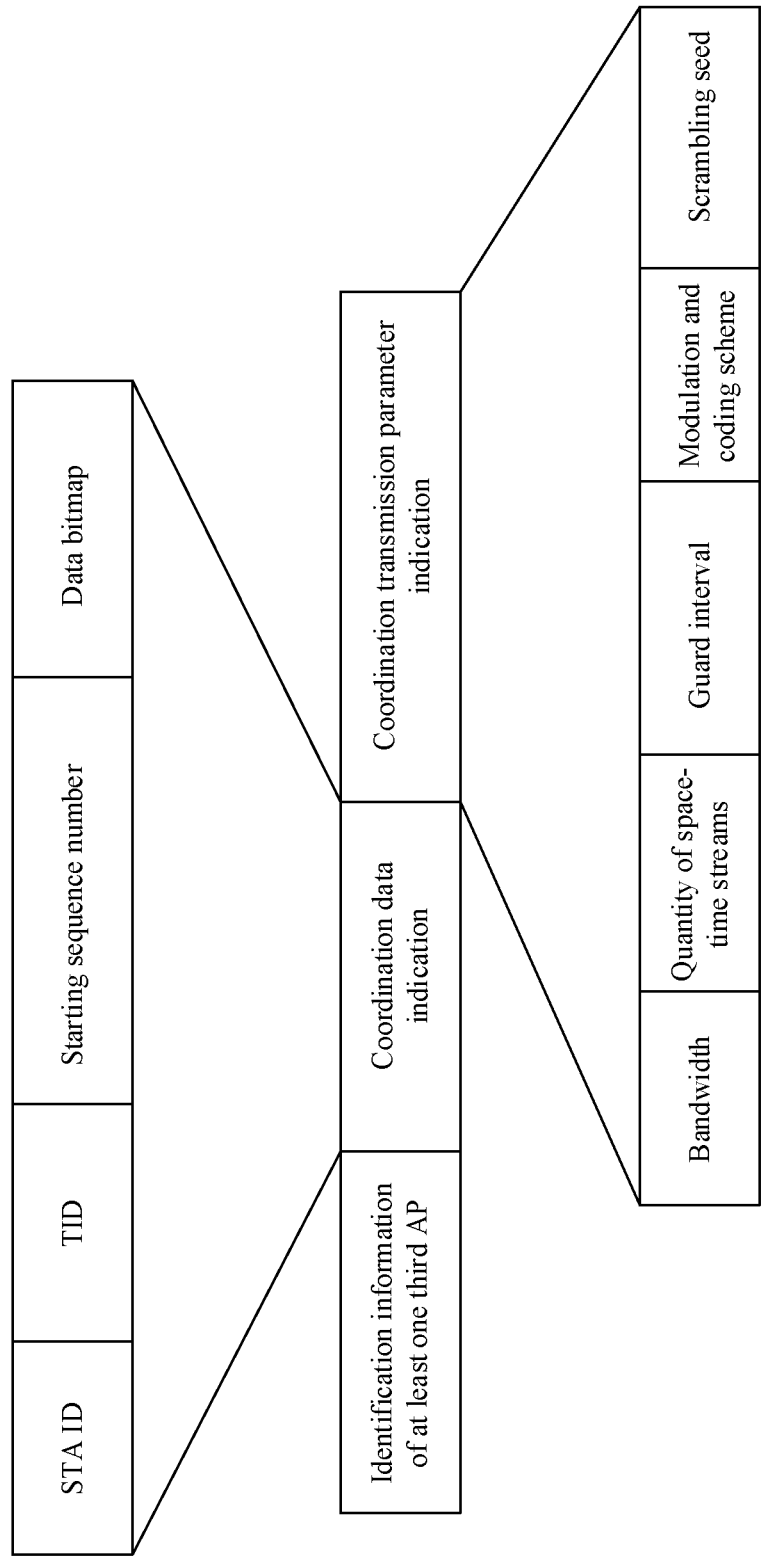
FIG. 6 is a schematic diagram of a frame structure of a joint transmission indication according to an embodiment of this application.

S205. The first AP sends, based on the response frame, a joint transmission indication to at least one third AP. The at least one third AP is one or more of the at least one second AP that has buffered the first data. Further, in this embodiment, AP 1 sends a joint transmission indication to AP 2 in APs 2-4 that have buffered the first data. In this embodiment of this application, a frame structure of the joint transmission indication is shown in FIG. 6. The joint transmission indication includes, but is not limited to, one or more of the following: identification information of at least one third AP, a coordination data indication, and a coordination transmission parameter indication. The coordination data indication field includes an object indicating that the at least one third AP needs to send the second data and indicating MSDUs in the second data that need to be sent. In this embodiment, in the joint transmission indication sent by AP 1 to AP 2, an STA ID is the MAC address information of STA 1 and STA 2. TID is TID1, starting sequence number is 1, and data bitmap is 1000. "1" in data bitmap indicates that a corresponding MSDU is successfully received, and "0" indicates that a corresponding MSDU fails to be received. Therefore, if data bitmap is "1000", it indicates that, in MSDUs 1-4 in TID1, MSDU 1 is successfully transmitted, and MSDUs 2-4 fail to be transmitted.

After receiving the joint transmission indication, AP 2 determines that the second data, that is, MSDUs 2-4 in TID1, needs to be sent to STA 1 and STA 2 after an SIFS from a time at which the joint transmission indication is received.

S206. The first AP and the at least one third AP jointly send the second data. Further, in this embodiment, AP 1 and AP 2 send the second data, that is, the MSDUs 2-4 of the TID1, to STA 1 and STA 2 after an SIFS from a time at which the joint transmission indication is received.

Figure 7:
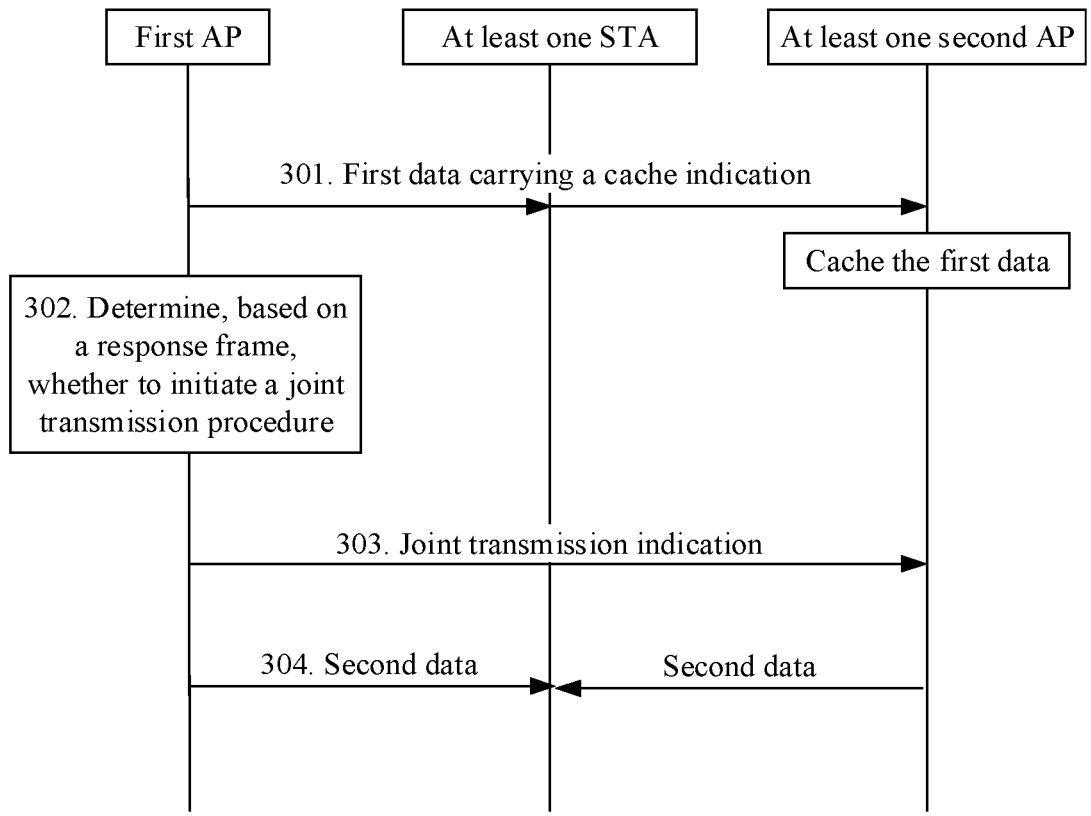
FIG. 7 is a third flowchart of a joint transmission method according to an embodiment of this application.

Scenario 3:

With reference to FIG. 2, FIG. 7 is a flowchart of a joint transmission method according to an embodiment of this application. In FIG. 7, the joint transmission method includes the following steps.

S301. A first AP sends first data carrying a buffer indication to at least one second AP.

That is, the buffer indication is included in the first data, and the buffer indication is sent to the at least one second AP together with the first data. In one example of this embodiment, the buffer indication includes, but is not limited to, identification information of at least one second AP, to instruct the at least one second AP to buffer all of the first data. In another example, the buffer indication includes, but is not limited to, identification information of at least one second AP and second data unit identification information, to instruct the at least one second AP to buffer some MSDUs in the second data as indicated by the second data unit identification information.

Further, in one example of this embodiment, for example, AP 1 sends the first data to STAs 1-3, where the first data carries transmission address information (MAC address information of AP 1), reception address information (MAC address information of STAs 1-3), and the buffer indication.

In this embodiment, the buffer indication includes MAC address information of APs 2-4 and a first data unit identifier. In this embodiment, a parameter such as a TID in the first data unit identifier is used to instruct APs 2-4 to buffer MSDUs 1-4 in TID1 of the first data.

An example in which APs 2-5 buffer the first data is used for description. When APs 2-5 detect the first data sent by AP 1, each of APs 2-5 reads the MAC address information of the AP included in the buffer indication carried in the first data, and performs matching between the MAC address information and its own MAC address information. Using AP 2 as an example, AP 2 reads the MAC address information of the AP included in the buffer indication carried in the first data, that is, the MAC address information of APs 2-4, and performs matching between the MAC address information and the MAC address information of AP 2. After determining that the matching succeeds, AP 2 buffers a specific MSDU indicated by the first data unit identifier included in the buffer indication carried in the first data, that is, MSDUs 1-4 in TID 1. That is, in this embodiment, each of APs 2-4 buffers MSDUs 1-4 in TID1 sent by AP 1 to STAs 1-3.

Figure 8:
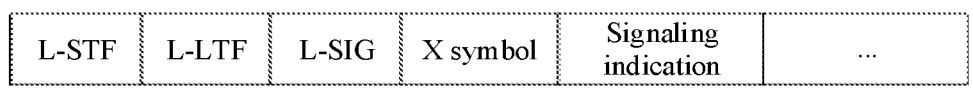
FIG. 8 is a first schematic diagram of a partial data frame structure according to an embodiment of this application.

In an embodiment, a physical layer frame structure of the first data is modified to carry the buffer indication. Further, the buffer indication may be included in a preamble of a PPDU carrying the first data. Further, FIG. 8 is a schematic diagram of a partial physical layer frame structure of the first data. In FIG. 8, a partial physical layer frame structure includes non-high throughput (Non-HT) legacy short training field (L-STF), Non-HT legacy long training field (L-LTF), Non-HT legacy signal (L-SIG), a frame format check field (X Symbol), and a signaling indication field. In this embodiment, the MAC address information of APs 2-4 and the data unit identifier may be included in the signaling indication field such that APs 2-4 can determine, by reading information included in the signaling indication field, whether APs 2-4 need to buffer a specified data part (that is, the MSDU indicated in the data unit identifier) in the first data to which the signaling indication field belongs.

Figure 9:
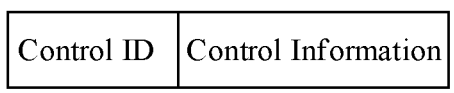
FIG. 9 is a second schematic diagram of a partial data frame structure according to an embodiment of this application.

In another embodiment, a MAC layer frame structure of the first data is modified to carry the buffer indication. For the MAC layer frame structure, reference may be made to the definition in The Institute of Electrical and Electronics Engineers (IEEE) 802.11 standard, where an A-Control field in the MAC layer frame structure may be used to carry control information. In the protocol, seven types of control information are defined for A-Control, and nine types of control information are reserved. FIG. 9 is a schematic diagram of a format of each type of control signaling in an A-Control field. In FIG. 9, a Control ID field is used to identify a type of control signaling, and a Control Information field is used to carry specific content of the control signaling. In the protocol, values 7-15 of the Control ID are reserved types. Therefore, one of the reserved types may be selected to carry the MAC address information of APs 2-4 and the data unit identifier, and the corresponding Control Information field includes a specific value of the MAC address information of APs 2-4 and a specific value of the data unit identifier.

S302. The first AP determines, based on a response frame returned by the at least one STA, whether a joint transmission procedure needs to be initiated.

S303. The first AP sends, based on the response frame, a joint transmission indication to at least one third AP.

S304. The first AP and the at least one third AP jointly send the second data.

For details about S302-S304, reference may be made to the foregoing steps S204-206. Details are not described herein again.

Figures 10, 11:
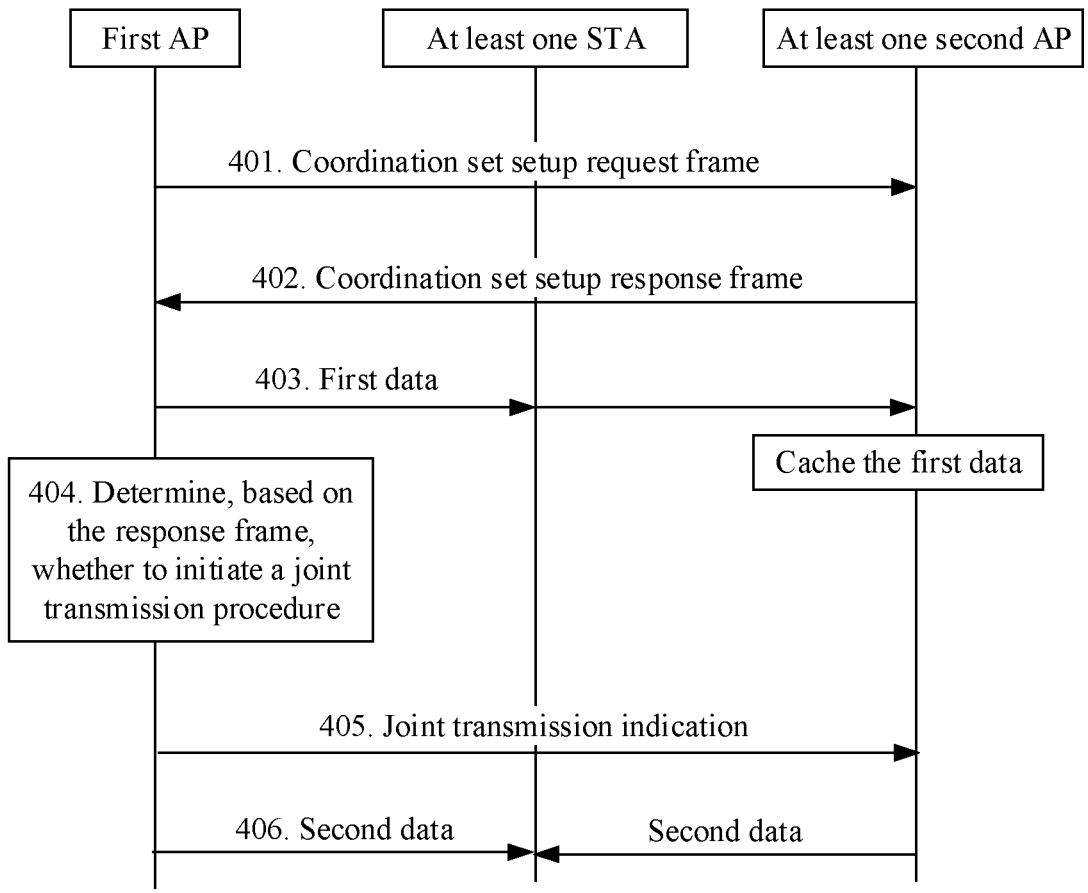
FIG. 10 is a fourth flowchart of a joint transmission method according to an embodiment of this application.
FIG. 11 is a first schematic diagram of a frame structure of a coordination set request frame according to an embodiment of this application.

Scenario 4:

With reference to FIG. 2, FIG. 10 is a flowchart of a joint transmission method according to an embodiment of this application. In FIG. 10, the joint transmission method includes the following steps.

S401. A first AP sends a coordination set setup request frame to at least one second AP. In this embodiment of this application, a coordination set setup request includes identification information of a coordination set and identification information of at least one second AP, to instruct the at least one second AP to set up the coordination set with the first AP. The coordination set setup request may also be used to instruct the at least one second AP belonging to a same coordination set with the first AP to buffer the first data sent by the first AP. For example, if AP 1 sets up a coordination relationship with APs 2-4, APs 2-4 buffer the first data carrying a MAC address of AP 1.

In an embodiment, the coordination set setup request may further include a buffer indication, where the buffer indication includes, but is not limited to, identification information of at least one STA, to instruct the at least one second AP to buffer the first data sent by the first AP to the at least one STA. The buffer indication may further include a quantity of at least one STA, to indicate a quantity of the at least one STA participating in the coordination set such that the second AP can quickly calculate a length of the buffer indication after receiving the coordination set setup request.

Further, in one example of this embodiment, for example, AP 1 sends a coordination set setup request frame to APs 2-4 to set up a coordination set with APs 2-4, and APs 2-4 may be referred to as coordinated APs of AP 1.

In an embodiment of this application, the coordination set request frame includes, but is not limited to, the following implementations.

In an embodiment, the coordination set request frame may include only information used to set up a coordination set, and when a plurality of coordination sets need to be set up, a plurality of coordination set request frames may be sequentially and serially sent. In an embodiment, a frame structure of the coordination set request message sent by AP 1 is shown in FIG. 11. In FIG. 11, the frame structure of the coordination set request message includes, but is not limited to, an ID of the coordination set, a quantity of STAs participating in the coordination set (in this embodiment, the quantity of STAs participating in the coordination set is 3), and MAC address information of the STAs participating in the coordination set (that is, the MAC address information of STAs 1-3). In this embodiment, the coordination set request frame also includes a receiving address, that is, address information of APs 2-4. In this embodiment, AP 1 sends, through unicast, the coordination set request frame to specified coordinated APs, that is, APs 2-4.

Figure 12:
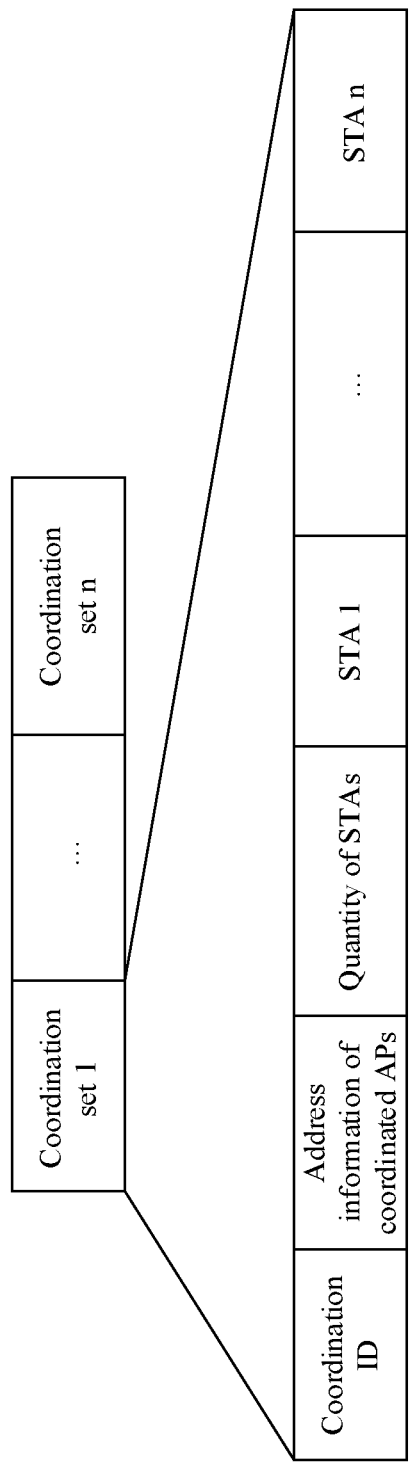
FIG. 12 is a second schematic diagram of a frame structure of a coordination set request frame according to an embodiment of this application.

In another embodiment, a coordination set request frame may include information used to set up a plurality of coordination sets, and the coordination set request frame may be sent when the plurality of coordination sets need to be set up. In one example, a frame structure of the coordination set request frame sent by AP 1 is shown in FIG. 12. In FIG. 12, the frame structure of the coordination set request frame includes a plurality of coordination set setup indications, and the frame structures of all the coordination set setup indications are the same and each include an ID of a coordination set, address information of a coordinated AP participating in the coordination set, a quantity of STAs participating in the coordination set, and MAC address information of the STAs participating in the coordination set. For example, an ID of a coordination set to be set up by AP 1 and AP 2 is a coordination set 1, STAs participating in the coordination set 1 include STAs 1-3, an ID of a coordination set to be set up by AP 1 and AP 3 is a coordination set 2, and STAs participating in the coordination set 2 include STAs 2-3. Then, the coordination set setup frame sent by AP 1 includes the coordination set 1, the address information of AP 2, the quantity of STAs (that is, 3), the MAC address information of STA 1, the MAC address information of STA 2, and the MAC address information of STA 3, the coordination set 2, the address information of AP 3, the quantity of STAs (that is, 2), the MAC address information of STA 2, and the MAC address information of STA 3.

In this embodiment, AP 1 sets up a plurality of coordination sets, and a coordination object corresponding to each coordination set is a coordinated AP indicated in each coordination set setup indication. In this embodiment, AP 1 broadcasts the coordination set request frame to APs 1-5. Each of APs 1-5 reads MAC address information of the AP indicated in the coordination set request frame, and buffers the information indicated in the coordination set setup indication corresponding to the MAC address information of the AP when identifying that the MAC address information of the AP includes its own MAC address information. For example, after AP 2 identifies that the coordination set setup request frame includes the address information of AP 2, AP 2 reads the information in the coordination set setup indication corresponding to the address information of AP 2, including the coordination set 1, the quantity of STAs (that is, 3), the MAC address information of STA 1, the MAC address information of STA 2, and the MAC address information of STA 3. Further, in this embodiment, the quantity of STAs participating in the coordination set indicated in the frame structure clearly indicates a length of the MAC address information of the STAs participating in the coordination set in the frame structure such that the coordinated AP can calculate a starting point of the corresponding coordination set based on the quantity of STAs when buffering a coordination set list corresponding to the AP.

In still another embodiment, AP 1 may also broadcast a coordination set request message to a plurality of second APs. In an embodiment, a frame structure of the coordination set request message sent by a master AP is shown in FIG. 13. In FIG. 13, the frame structure includes, but is not limited to, an ID of a coordination set, a quantity of coordinated APs participating in the coordination set, MAC address information of the coordinated AP participating in the coordination set, and MAC address information of the STA participating in the coordination set. AP 1 sets up a coordination set with APs 2-4 and indicates the STA participating in the coordination set in the coordination set setup request frame, that is, STAs 1-3. Likewise, indicating the quantity of coordinated APs and the quantity of STAs in the coordination set setup request frame enables the coordinated APs, that is, APs 2-4, to quickly calculate the length of the request frame after receiving the request frame.

Likewise, in this embodiment, APs 2-4 locally buffer the information indicated in the buffer indication.

S402. The at least one second AP returns a coordination set setup response frame to AP 1. Further, after receiving the coordination set setup request frame sent by AP 1, APs 2-4 return the coordination set setup response frame to AP 1. In addition, APs 2-4 buffer information carried in the coordination set request frame, including information such as the address information of AP 1, the ID of the coordination set, and the STA participating in the coordination set.

S403. The first AP sends the first data to the at least one STA. Further, in this embodiment, AP 1 sends the first data to STAs 1-3. When APs 2-4 detect the first data sent over the channel, APs 2-4 identify reception address information (the MAC address information of STAs 1-3) and transmission address information (the MAC address information of AP 1) in the first data, and perform matching between the reception address information and the transmission address information and the locally stored information. In this embodiment, if the matching performed by APs 2-4 succeeds, APs 2-4 buffer the first data sent by the first AP to STAs 1-3.

S404. The first AP determines, based on a response frame returned by the at least one STA, whether a joint transmission procedure needs to be initiated.

This step is similar to the foregoing step S204. Details are not described herein again.

S405. The first AP sends, based on the response frame, a joint transmission indication to at least one third AP. In this embodiment, the joint transmission indication includes, but is not limited to, identification information of a coordination set, identification information of at least one STA, and second data unit identification information, to instruct at least one third AP belonging to the coordination set in the joint transmission indication to send second data to the at least one STA. Alternatively, the joint transmission indication may include the identification information of the at least one third AP, the identification information of the at least one STA, and the second data unit identification information. A function of the information carried in the joint transmission indication is the same as that in the foregoing embodiment. Details are not described herein again.

Further, AP 1 sends the joint transmission indication to AP 2. In this embodiment, the joint transmission indication includes, but is not limited to, an ID of the coordination set (that is, the coordination set 1) and/or MAC address information of a coordinated AP (that is, the MAC address information of AP 2), MAC address information of STA 1 and STA 2, TID (TID is 1 in this embodiment), starting sequence number (starting sequence number is 1 in this embodiment), data bitmap (data bitmap is 1000), and transmission parameters.

In this embodiment, after receiving the joint transmission indication, AP 2 performs matching between the ID of the coordination set and/or the MAC address information of the coordinated AP in the joint transmission indication and locally buffered information, and if the matching succeeds, performs matching between transmission address information (the MAC address information of AP 1) carried in the joint transmission indication and the locally buffered information. A reason for performing matching between the address information of AP 1 and the locally buffered information is that when there is a plurality of first APs in the system, different first APs may have a coordination set with a same coordination set ID. If AP 2 performs only matching between ID of the coordination set and the locally buffered information, data sent by another first AP may be buffered, a device burden is increased, and a risk of buffer overflow exists.

S406. The first AP and the at least one third AP jointly send the second data.

This step is similar to the foregoing step S206. Details are not described herein again.

Figure 14:
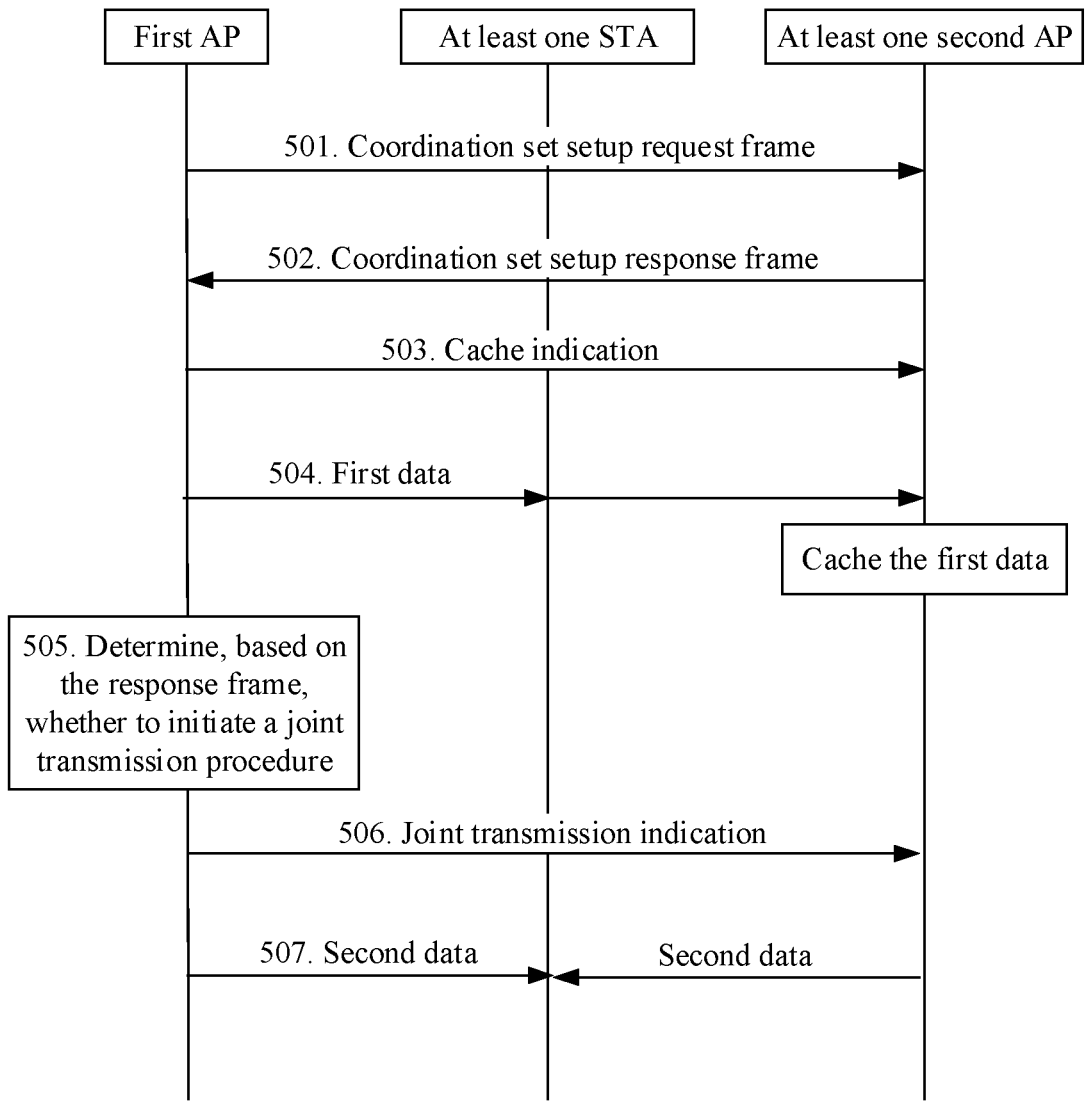
FIG. 14 is a fifth flowchart of a joint transmission method according to an embodiment of this application.

Scenario 5:

With reference to FIG. 2, FIG. 14 is a flowchart of a joint transmission method according to an embodiment of this application. In FIG. 14, the joint transmission method includes the following steps.

S501. A first AP sends a coordination set setup request frame to at least one second AP. Further, in this embodiment, AP 1 sends a coordination set setup request frame to APs 2-4. Unlike the coordination set setup request frame in Scenario 4, a coordination set setup request in this embodiment does not carry a buffer indication, but carries only transmission address information (MAC address information of AP 1), an ID of a coordination set, and MAC address information of APs 2-4. That is, no STA participating in the coordination set is indicated in the coordination set request.

Other details about this step are similar to those of step S401. Details are not described herein again.

S502. The at least one second AP returns a coordination set setup response frame to AP 1.

This step is similar to the foregoing step S402. Details are not described herein again.

S503. A first AP sends a buffer indication to at least one second AP. Further, AP 1 sends a SyncForBuffer frame (that is, the buffer indication) to APs 2-4. In this embodiment, the SyncForBuffer frame carries the MAC address information of AP 1 and the buffer indication, where the buffer indication includes, but is not limited to, an ID of a coordination set, MAC address information of STAs 1-3, and a first data unit identifier. In this embodiment and the following embodiments, an example in which the coordination set is set up between AP 1 and APs 2-4, and the ID of the coordination set is a coordination set 1 is used for description. Then, in this embodiment, the ID of the coordination set included in the buffer indication is the coordination set 1. Then, the APs participating in the coordination set 1, that is, APs 2-4, buffer the first data when detecting the first data carrying the MAC address information of STAs 1-3 and the MAC address information of AP 1.

S504. The first AP sends the first data to the at least one STA.

This step is similar to the foregoing step S403. Details are not described herein again.

S505. The first AP determines, based on a response frame returned by the at least one STA, whether a joint transmission procedure needs to be initiated.

This step is similar to the foregoing step S204. Details are not described herein again.

S506. The first AP sends, based on the response frame, a joint transmission indication to at least one third AP. Further, AP 1 sends the joint transmission indication to AP 2. In this embodiment, the joint transmission indication includes, but is not limited to, an ID of a coordination set (that is, the coordination set 1), the MAC address information of STA 1 and STA 2, TID (TID is 1 in this embodiment), starting sequence number (starting sequence number is 1 in this embodiment), data bitmap (data bitmap is 1000), and transmission parameters.

This step is similar to the foregoing step S405. Details are not described herein again.

S507. The first AP and the at least one third AP jointly send second data.

This step is similar to the foregoing step S206. Details are not described herein again.

Figure 15:
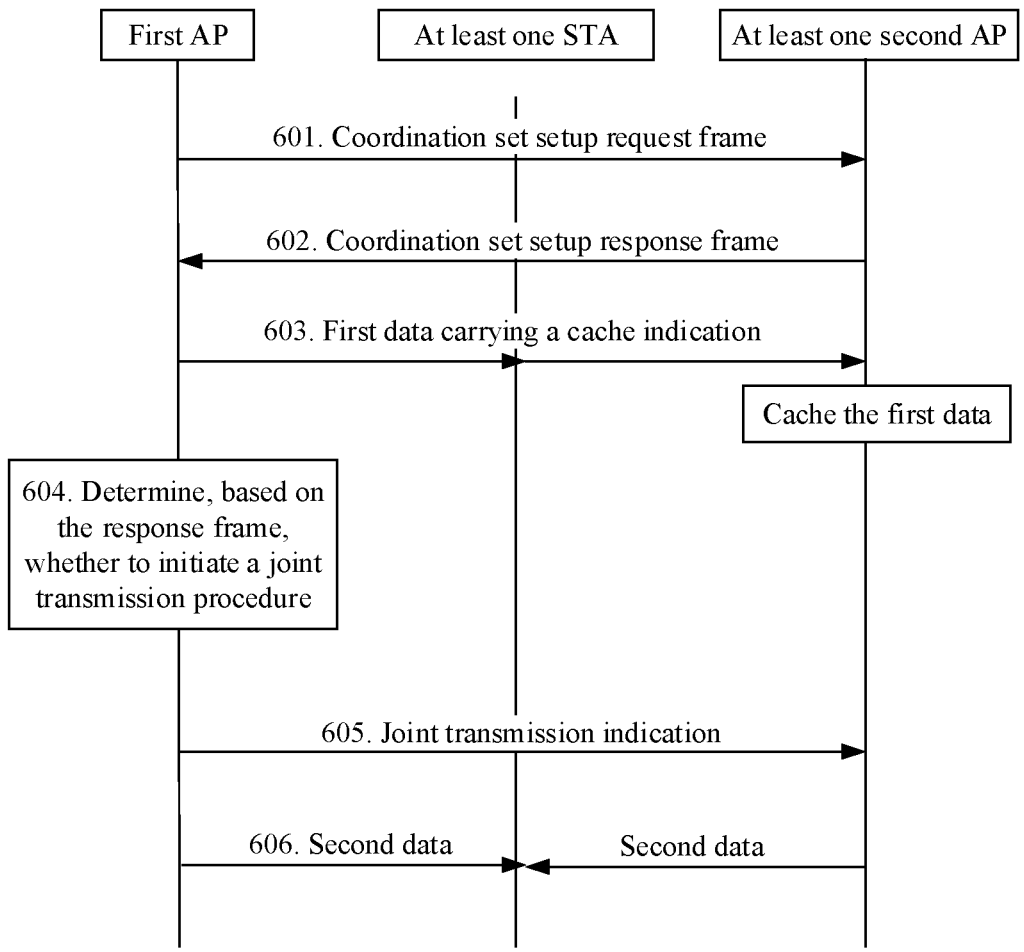
FIG. 15 is a sixth flowchart of a joint transmission method according to an embodiment of this application.

Scenario 6:

With reference to FIG. 2, FIG. 15 is a flowchart of a joint transmission method according to an embodiment of this application. In FIG. 15, the joint transmission method includes the following steps.

S601. A first AP sends a coordination set setup request frame to at least one second AP.

This step is similar to the foregoing step S501. Details are not described herein again.

S602. The at least one second AP returns a coordination set setup response frame to AP 1.

This step is similar to the foregoing step S402. Details are not described herein again.

S603. The first AP sends first data carrying a buffer indication to the at least one second AP. Further, AP 1 sends the first data to STAs 1-3. Unlike step S301 in Scenario 3, in this embodiment, the buffer indication includes the ID of the coordination set, and optionally, the buffer indication may further include the first data unit identifier, but not the MAC address information of APs 2-4. Therefore, when APs 2-4 identify the buffer indication carrying the coordination set 1, APs 2-4 buffer, based on the buffer indication, an MSDU specified in the first data when APs 2-4 detect the first data carrying the address information of AP 1 and the MAC address information of STAs 1-3. For example, if AP 1 and APs 2-4 belong to the coordination set 1, when APs 2-4 receive the buffer indication including the coordination set 1, APs 2-4 buffer, based on the buffer indication, data sent by AP 1.

In one example, the buffer indication may be carried in a physical layer preamble of the first data, and optionally, may be carried in a new signaling field in the physical layer preamble, for example, a newly added signaling field may include a coordination ID field.

In another example, the coordination ID in the buffer indication may be carried in an A-Control field of the first data. The A-Control field may carry various types of control information. Currently, there are seven types of control information in an IEEE 802.11ax standard, and nine types of control information are reserved. One of these reserved types can be indicative of the coordination ID. The A-control field includes a Control ID field (Control ID) and a Control Information field (Control Information), where the Control Information field is used to carry specific content of the control signaling. Further, one of values 7-15 of the Control ID may be indicative of a new coordination ID, and a value of the coordination ID is placed in a corresponding Control Information field. For example, the value of Control ID is 7, and a corresponding value of Control Information is the ID of the coordination set 1.

When a second AP receiving the buffer indication finds that the coordination ID matches an ID of coordination set up by the second AP, the second AP may determine that the second AP may be a coordinated AP. To further determine whether the second AP is a coordinated AP, the second AP may continue to parse a MAC header of the first data. When the second AP finds that a transmission address in a MAC header of the first data matches the MAC address of the first AP in the coordination ID set, the second AP determines that the second AP is a coordinated AP, and then buffers all or a part of the first data based on the buffer indication. On the contrary, if the transmission address does not match the MAC address of the first AP in the coordination set ID, the second AP determines that the second AP is not a coordinated AP and may stop parsing.

When the first AP does not require the second AP (a coordinated AP) to buffer the first data, the coordination ID field may also be set to be an unassigned coordination ID, or a special coordination ID value (for example, all 0s or all 1s) may be defined in a standard, where the value indicates that no coordinated AP needs to buffer the first data.

Other details about this step are similar to those of the foregoing step S301. Details are not described herein again.

S604. The first AP determines, based on a response frame returned by the at least one STA, whether a joint transmission procedure needs to be initiated.

This step is similar to the foregoing step S204. Details are not described herein again.

S605. The first AP sends, based on the response frame, a joint transmission indication to at least one third AP.

This step is similar to the foregoing step S405. Details are not described herein again.

S606. The first AP and the at least one third AP jointly send second data.

This step is similar to the foregoing step S206. Details are not described herein again.

Further, in this embodiment of this application, the second AP may further send a buffer clearing indication to the at least one second AP, where the buffer clearing indication is used to instruct the at least one second AP to clear all or a part of the buffered data. Parameters in the buffer clearing indication may include one or a combination of the following.

Identification information of the at least one second AP, which is indicative of second APs that need to clear data. For example, if AP 1 sends a buffer clearing indication carrying the MAC address information of APs 2-4 to APs 2-5, APs 2-4 clear all data that is sent by AP 1 and that is buffered.

Identification information of the at least one STA, which is indicative of STAs whose buffered data needs to be cleared by the second AP. For example, if AP 1 sends a buffer clearing indication carrying the MAC address information of STAs 1-3 to AP 2, AP 2 clears the data that is sent by AP 1 to STAs 1-3 and that is buffered.

Identification information of at least one MSDU, which is indicative of MSDUs that need to be cleared by the second AP. For example, if AP 1 sends a buffer clearing indication carrying TID1 and MSDUs 1-4 to AP 2, AP 2 clears MSDUs 1-4 in TID1 sent by AP 1.

In an embodiment of this application, the buffer clearing indication may be sent by the first AP to the second AP at a specified time, or the clearing indication may be delivered to the second AP based on the joint transmission indication.

For example, (1) If the data bitmap field in the joint transmission indication sent by AP 1 to APs 2-5 is all 0s, that is, all the data of STAs 1-3 is received correctly, APs 2-5 clear the data that is locally buffered and that corresponds to STAs (STAs 1-3) specified in the joint transmission indication.

(2) AP 1 may agree with all the APs that if the starting sequence number in the joint transmission indication is greater than the Sequence number buffered by APs 2-5, APs 2-5 clear the data corresponding to the STAs (STAs 1-3) specified in the joint transmission indication. Then, in actual application, AP 1 may instruct APs 2-5 to clear the data of the specified STA by setting the starting sequence number in the joint transmission indication sent to APs 2-5 to be greater than the maximum sequence number of the MSDU buffered by APs 2-5.

The clearing indication step can be applied to any one of scenario 1 to scenario 5. Based on the clearing operation, pressure of the AP can be relieved, and a risk of buffer overflow caused by excessive buffered data of the AP can be avoided.

The solutions provided in the embodiments of the present disclosure are mainly described from the perspective of interaction between various network elements. It can be understood that, to implement the foregoing functions, the AP includes corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present disclosure, the AP may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in this embodiment of the present disclosure, module division is exemplary, and is merely a logical function division. In actual implementation, another division manner may be used.

Figure 16:
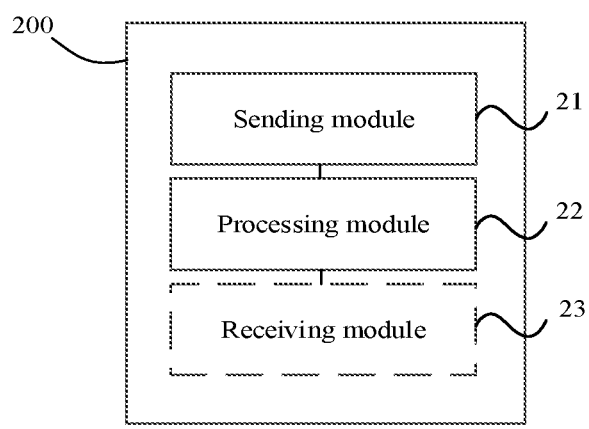
FIG. 16 is a first schematic block diagram of an apparatus on a first access point side according to an embodiment of this application.

When the respective functional modules are obtained through division based on the respective functions, FIG. 16 is a possible schematic structural diagram of an apparatus 200 on a first access point side used in the foregoing embodiments. As shown in FIG. 16, the apparatus 200 may include a sending module 21 and a processing module 22. The sending module 21 may be configured to support a first access point in performing steps S101, S201, S301, S503, and S603 in the foregoing embodiments, that is, the steps for sending a buffer indication, or may be configured to support the first access point in performing steps S102, S203, S403, and S504 in the foregoing embodiments, that is, the steps for sending the first data, or may be configured to support the first access point in performing steps S104, S205, S303, S405, S506, and S605 in the foregoing embodiments, that is, the steps for sending a joint transmission indication, or may be configured to support the first access point in performing steps S105, S206, S304, S406, S507, and S606 in the foregoing embodiments, that is, the steps for sending second data, or may be configured to support the first access point in performing steps S401, S501, and S601 in the foregoing embodiments, that is, the steps for sending a coordination setup request. The processing module 22 may be configured to support the first access point in performing steps S103, S204, S302, S404, S505, and S604 in the foregoing embodiments, that is, the steps for determining whether a joint transmission procedure needs to be initiated.

Optionally, as shown in FIG. 16, the apparatus 200 may further include a receiving module 23, which may be configured to support the first access point in performing steps S402, S502, and S602 in the foregoing embodiments, that is, the steps for receiving a coordination set setup response frame. All related content of the steps in the foregoing method embodiments may be cited in function descriptions of corresponding functional modules. Details are not described herein again.

Figure 17:
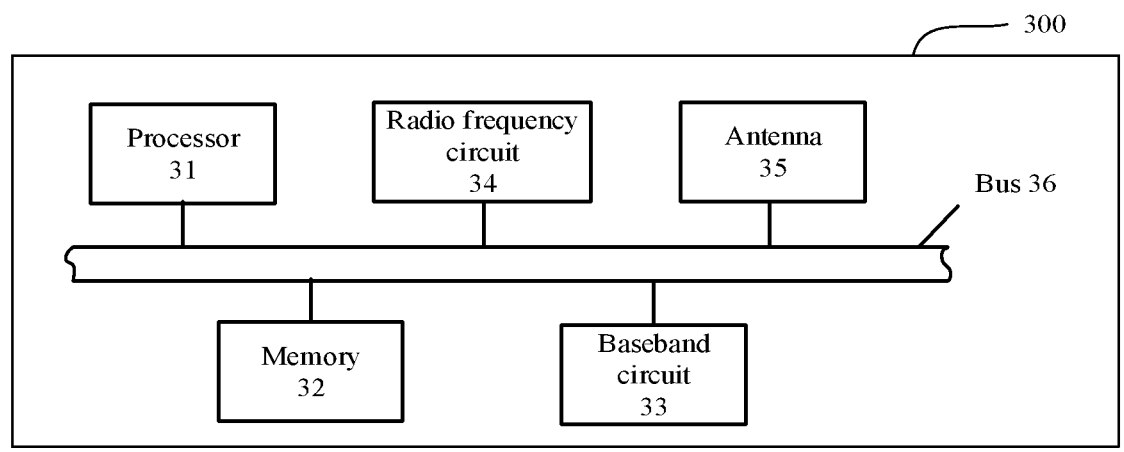
FIG. 17 is a second schematic block diagram of an apparatus on a first access point side according to an embodiment of this application.

In another example, FIG. 17 is a schematic block diagram of another communications apparatus 300 on a first access point side according to an embodiment of this application. The apparatus 300 in this embodiment of this application may be the first access point in the foregoing method embodiments, and the apparatus 300 may be configured to perform some or all of the functions of the first access point in the foregoing method embodiments. The apparatus 300 may include a processor 31, a baseband circuit 33, a radio frequency circuit 34, and an antenna 35. Optionally, the apparatus 300 may further include a memory 32. Components of the apparatus 300 are coupled together using a bus 36. In addition to a data bus, the bus 36 includes a power bus, a control bus, and a status signal bus. However, for clear description, various types of buses in the figure are marked as the bus system 36.

The processor 31 may be configured to implement control of the first access point and perform processing performed by the first access point in the foregoing embodiments. The processor 31 may perform processing related to the first access point in the foregoing method embodiments, and/or perform another process in the technology described in this application. The processor 31 may further run an operating system, manage the bus, and execute a program or an instruction stored in the memory.

The baseband circuit 33, the radio frequency circuit 34, and the antenna 35 may be configured to support sending and receiving of information between the first access point and the second access point or a station used in the foregoing embodiments in order to support wireless communication between the first access point and another node. In one example, a buffer indication is generated through encoding by the baseband circuit 33 and encapsulation based on a protocol, the radio frequency circuit performs processing such as analog conversion, filtering, amplification, and up-conversion on the buffer indication, and then the buffer indication is sent to the second access point through the antenna 35. In another example, after a coordination response message sent by the second access point is received through the antenna 35, the radio frequency circuit 34 performs processing such as filtering, amplification, down-conversion, and digitization on the coordination response message, the baseband circuit 33 performs baseband processing such as decoding and decapsulation based on a protocol, and then the processor 31 performs processing to restore service data and signaling information sent by the station. It can be understood that the baseband circuit 33, the radio frequency circuit 34, and the antenna 35 may be further configured to support communication between the first access point and another network entity, for example, to support communication between the first access point and a network element on a core network side.

The memory 32 may be configured to store program code and data of the first access point. A person skilled in the art may easily understand that the memory 32 or any part thereof may be located outside the apparatus 300. For example, the memory 32 may include a transmission line, and/or a computer product separate from the wireless node. All these media may be accessed by the processor 31 through a bus interface 36. Alternatively, the memory 32 or any part thereof may be integrated into the processor 31, for example, may be a buffer and/or a general-purpose register.

It can be understood that FIG. 17 shows only a simplified design of the first access point. For example, in actual application, the first access point may include any quantity of transmitters, receivers, processors, memories, and the like. All the first access points that can implement the present disclosure fall within the protection scope of the present disclosure.

Figure 18:
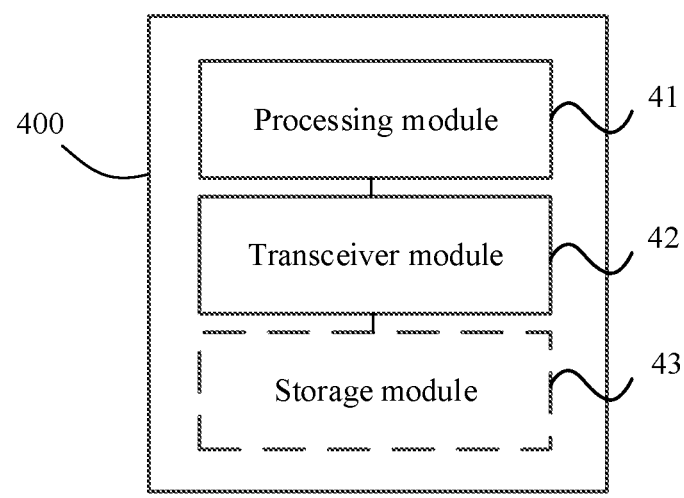
FIG. 18 is a first schematic block diagram of an apparatus on a second access point side according to an embodiment of this application.

FIG. 18 is a schematic block diagram of an apparatus 400 on a second access point side according to an embodiment of this application. In an embodiment, the apparatus 400 shown in FIG. 18 may correspond to the apparatus on the second access point side in the foregoing method embodiments, and may have any function of the second access point in the method embodiments. Optionally, the apparatus 400 in this embodiment of this application may be a second access point or a chip in the second access point. The apparatus 400 may include a processing module 41 and a transceiver module 42. Optionally, the apparatus 400 may further include a storage module 43. The storage module 43 may be configured to buffer all or a part of first data indicated in a buffer indication.

For example, the processing module 41 may be configured to perform the step of buffering the first data in the foregoing method embodiments, or may be configured to perform step S202. The processing module 41 may be further configured to instruct the storage module 43 to buffer all or a part of the first data indicated in the buffer indication.

It can be understood that the transceiver module 42 may include a receiving module and a sending module. The receiving module may be configured to receive signaling or data sent in steps S101, S102, S104, S201, S203, S205, S301, S303, S401, S403, S405, S501, S503, S504, S506, S601, S603, and S605 in the foregoing method embodiments. The sending module may be further configured to perform steps S105, S206, S304, S406, S502, S507, S602, and S606 in the foregoing method embodiments. It should be understood that the apparatus 400 according to this embodiment of this application may correspond to the second access point in the foregoing method embodiments, and the foregoing and other management operations and/or functions of the respective modules in the apparatus 400 are respectively used to implement the corresponding steps of the foregoing methods. For brevity, details are not described herein again.

Alternatively, the apparatus 400 may be configured as a general-purpose processing system, for example, a chip. The processing module 41 may include one or more processors providing processing functions. The transceiver module 42 may be, for example, an input/output interface, a pin, or a circuit. The input/output interface may be used to exchange information between the chip system and the outside. For example, the input/output interface may process a scheduling request message output that is input to the chip by another module outside the chip. The processing module may execute a computer-executable instruction stored in the storage module to implement the functions of the second access point in the method embodiments. In one example, the storage module 43 optionally included in the apparatus 400 may be a storage unit on the chip, such as a register or a buffer. The storage module 43 may alternatively be a storage unit located outside the chip, for example, a ROM or another type of static storage device that can store static information and instructions, or a RAM.

Figure 19:
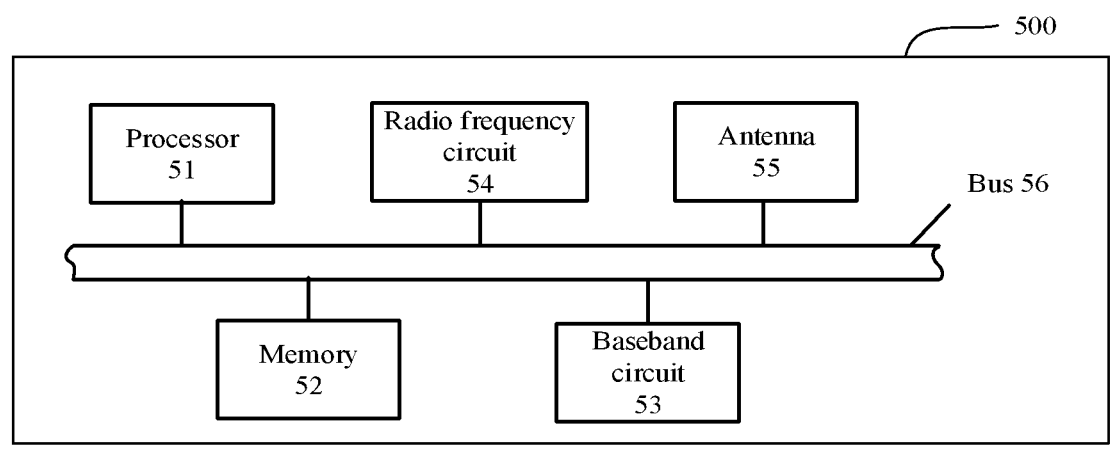
FIG. 19 is a second schematic block diagram of an apparatus on a second access point side according to an embodiment of this application.

In another example, FIG. 19 is a schematic block diagram of a communications apparatus 500 on a second access point side according to an embodiment of this application. The apparatus 500 in this embodiment of this application may be a second access point in the foregoing method embodiments. The apparatus 500 may be configured to perform some or all of the functions of the second access point in the foregoing method embodiments. The apparatus 500 may include a processor 51, a baseband circuit 53, a radio frequency circuit 54, and an antenna 55. Optionally, the apparatus 500 may further include a memory 52. Components of the apparatus 500 are coupled together using a bus 56. In addition to a data bus, the bus 56 includes a power bus, a control bus, and a status signal bus. However, for clear description, various types of buses in the figure are marked as the bus system 56.

The processor 51 may be configured to implement control of the second access point and perform processing performed by the second access point in the foregoing embodiments. The processor 51 may perform processing related to the second access point in the foregoing method embodiments, and/or perform another process in the technology described in this application. The processor 51 may further run an operating system, manage the bus, and execute a program or an instruction stored in the memory.

The baseband circuit 53, the radio frequency circuit 54, and the antenna 55 may be configured to support sending and receiving of information between the second access point and the first access point or a station used in the foregoing embodiments in order to support wireless communication between the second access point and another node. In one example, a buffer indication sent by the first access point is received through the antenna 55, the radio frequency circuit 54 performs processing such as filtering, amplification, down-conversion, and digitization on the buffer indication, the baseband circuit 53 performs baseband processing such as decoding and decapsulation based on a protocol, and the processor 51 performs processing to restore service data and signaling information sent by the station. In another example, a coordination response message sent by the second access point may be processed by the processor 51, the baseband circuit 53 performs baseband processing such as encapsulation based on a protocol and encoding on the coordination response message, then the radio frequency circuit 54 performs radio frequency processing such as analog conversion, filtering, amplification, and up-conversion on the coordination response message, and then the coordination response message is sent to the first AP through the antenna 55. It can be understood that the baseband circuit 53, the radio frequency circuit 54, and the antenna 55 may be further configured to support communication between the second access point and another network entity, for example, to support communication between the second access point and a network element on a core network side.

The memory 52 may be configured to store program code and data of the second access point, and the memory 52 may be the storage module 43 in FIG. 18. In FIG. 19, the memory 52 is shown as separate from the processor 51. However, a person skilled in the art may easily understand that the memory 52 or any part thereof may be located outside the apparatus 500. For example, the memory 52 may include a transmission line, and/or a computer product separate from the wireless node. All these media may be accessed by the processor 51 through a bus interface 56. Alternatively, the memory 52 or any part thereof may be integrated into the processor 51, for example, may be a buffer and/or a general-purpose register.

It can be understood that FIG. 19 shows only a simplified design of the second access point. For example, in actual application, the second access point may include any quantity of transmitters, receivers, processors, memories, and the like. All the second access points that can implement the present disclosure fall within the protection scope of the present disclosure.

An embodiment of this application further provides a computer storage medium, where the computer-readable storage medium stores an instruction, and the instruction can be executed by one or more processors on a processing circuit. When the instruction is run on a computer, the computer is enabled to perform the methods according to the foregoing aspects.

An embodiment of this application further provides a chip system, where the chip system includes a processor configured to support a distributed unit, a centralized unit, and a first access point or a second access point in order to implement functions used in the foregoing embodiments, such as generating or processing data and/or information used in the foregoing methods.

In a possible design, the chip system may further include a memory, where the memory is configured to store necessary program instructions and data for the distributed unit, the centralized unit, and the first access point or the second access point. The chip system may include a chip, or may include a chip and another discrete device.

An embodiment of this application further provides a processor, where the processor is configured to couple to a memory in order to perform methods and functions related to the first AP in any one of the foregoing embodiments.

An embodiment of this application further provides a processor, where the processor is configured to couple to a memory in order to perform methods and functions related to the second AP in any one of the foregoing embodiments.

An embodiment of this application further provides a computer program product including an instruction, where when the computer program product runs on a computer, the computer is enabled to perform methods and functions related to the first AP in any one of the foregoing embodiments.

An embodiment of this application further provides a computer program product including an instruction, where when the computer program product runs on a computer, the computer is enabled to perform methods and functions related to the second AP in any one of the foregoing embodiments.

An embodiment of this application further provides a wireless communications system, where the system includes a first access point and at least one second access point that are used in the foregoing embodiments.

Methods or algorithm steps described in combination with the content disclosed in this embodiment of the present disclosure may be implemented by hardware, or may be implemented by a processor by executing a software instruction. The software instruction may include a corresponding software module. The software module may be stored in a RAM, a flash memory, a ROM, an erasable programmable ROM (EPROM), an electrically EPROM (EEPROM), a register, a hard disk, a mobile hard disk, a compact disc (CD) ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in AP. Certainly, the processor and the storage medium may exist in the AP as discrete components.

A person skilled in the art should be aware that in the foregoing one or more examples, functions described in the embodiments of the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present disclosure are further described in detail. It should be understood that the foregoing descriptions are merely specific implementation manners of the embodiments of the present disclosure, but are not intended to limit the protection scope of the embodiments of present disclosure. Any modification, equivalent replacement, or improvement made based on technical solutions of the embodiments of the present disclosure shall fall within the protection scope of the embodiments of the present disclosure.

What is claimed is:

1. A first access point (AP) comprising:
a memory configured to store instructions; and
a processor coupled to the memory, wherein the instructions cause the processor to be configured to:
send a buffer indication to one or more second APs to instruct the one or more second APs to buffer first data that comprises data of a station (STA), wherein the buffer indication is comprised in a physical layer preamble of the first data or is comprised in an A-Control field of the first data;
send the first data to the STA;
receive a response frame from the STA in response to the first data;
determine, based on the response frame, to initiate a joint transmission procedure;
send a joint transmission indication to at least one third AP of the one or more second APs in response to determining to initiate the joint transmission procedure, wherein the joint transmission indication instructs the at least one third AP to send second data to the STA at a first sending time, wherein the second data comprises at least some of the first data; and
send the second data at the first sending time.

2. The first AP of claim 1, wherein the buffer indication comprises first identification information of the one or more second APs.

3. The first AP of claim 2, wherein the first AP and the one or more second APs belong to a coordination set, and wherein the first identification information is an identifier (ID) of the coordination set.

4. The first AP of claim 1, wherein the buffer indication comprises second identification information of the STA.

5. The first AP of claim 1, wherein the first data comprises at least one media access control (MAC) service data unit (MSDU), and wherein the buffer indication comprises a first data unit identifier of the at least one MSDU.

6. The first AP of claim 5, wherein the first data unit identifier comprises a traffic identifier of the at least one MSDU, a starting sequence number of a starting MSDU of the at least one MSDU, and a quantity of consecutive buffered MSDUs starting from the starting MSDU.

7. The first AP of claim 1, wherein the joint transmission indication further comprises at least one of the following:
third identification information of the at least one third AP;
fourth identification information of a second STA corresponding to the second data; or
a second data unit identifier of a media access control (MAC) service data unit (MSDU) in the second data.

8. A second access point (AP) comprising:
a memory configured to store instructions; and
a processor coupled to the memory, wherein the instructions cause the processor to be configured to:
receive, from a first AP, a buffer indication instructing to buffer first data of a station (STA), wherein the buffer indication is comprised in a preamble of a physical layer protocol data unit (PPDU) carrying the first data or is comprised in an A-Control field of the first data;
receive the first data from the first AP;
buffer, based on the buffer indication, the first data;
receive, from the first AP, a joint transmission indication instructing the second AP to send second data to the STA at a first time, wherein the second data comprises at least some of the first data; and
send, based on the joint transmission indication, the second data to the STA at the first time, wherein the first time is the same as a second time at which the first AP sends the second data.

9. The second AP of claim 8, wherein the buffer indication comprises first identification information of the second AP.

10. The second AP of claim 9, wherein the first AP and the second AP belong to a coordination set, and wherein the first identification information is an identifier (ID) of the coordination set.

11. The second AP of claim 8, wherein the buffer indication comprises second identification information of the STA, and wherein the instructions further cause the processor to be configured to further buffer the first data based on the second identification information.

12. The second AP of claim 8, wherein the first data comprises at least one media access control (MAC) service data unit (MSDU), wherein the buffer indication comprises a first data unit identifier of the at least one MSDU, and wherein the instructions further cause the processor to be configured to buffer the at least one MSDU based on the first data unit identifier.

13. The second AP of claim 12, wherein the first data unit identifier comprises a traffic identifier of the at least one MSDU, a starting sequence number of a starting MSDU of the at least one MSDU, and a quantity of consecutive buffered MSDUs starting from the starting MSDU.

14. The second AP of claim 8, wherein the joint transmission indication further comprises at least one of:
third identification information of the second AP;
fourth identification information of a second STA corresponding to the second data; or
a second data unit identifier of a media access control (MAC) service data unit (MSDU) in the second data.

15. A joint transmission method implemented by a first access point (AP), wherein the joint transmission method comprises:
sending a buffer indication to one or more second APs to instruct the one or more second APs to buffer first data that comprises data of a station (STA), wherein the buffer indication is comprised in a physical layer preamble of the first data or is comprised in an A-Control field of the first data;
sending the first data to the STA;
receiving a response frame from the STA;
determining, based on the response frame, to initiate a joint transmission procedure;

sending a joint transmission indication to at least one third AP of the one or more second APs in response to determining to initiate the joint transmission procedure, wherein the joint transmission indication instructs the at least one third AP to send second data to the STA at a first sending time, wherein the second data comprises all or a part of the first data; and sending the second data at the first sending time.

16. The joint transmission method of claim 15, wherein the buffer indication comprises first identification information of the one or more second APs.

17. The joint transmission method of claim 16, wherein the first AP and the one or more second APs belong to a coordination set, and wherein the first identification information is an identifier (ID) of the coordination set.

18. The joint transmission method of claim 15, wherein the buffer indication comprises second identification information of the STA.

19. The joint transmission method of claim 15, wherein the first data comprises at least one media access control (MAC) service data unit (MSDU), and wherein the buffer indication comprises a first data unit identifier of the at least one MSDU.

20. The joint transmission method of claim 19, wherein the first data unit identifier comprises a traffic identifier of the at least one MSDU, a starting sequence number of a starting MSDU of the at least one MSDU, and a quantity of consecutive buffered MSDUs starting from the starting MSDU.

* * * * *